US010207564B2

(12) United States Patent
Hamamoto et al.

(10) Patent No.: US 10,207,564 B2
(45) Date of Patent: Feb. 19, 2019

(54) VEHICLE AIR CONDITIONER

(71) Applicants: JAPAN CLIMATE SYSTEMS CORPORATION, Hiroshima (JP); Panasonic Corporation, Osaka (JP)

(72) Inventors: Hiroshi Hamamoto, Hiroshima (JP); Kohei Fukawatase, Hiroshima (JP); Yoshihiko Otake, Hiroshima (JP); Kou Komori, Nara (JP); Subaru Matsumoto, Tochigi (JP)

(73) Assignees: Japan Climate Systems Corporation, Hiroshima (JP); Panasonic Corporation, Osaka (JP)

( * ) Notice: Subject to any disclaimer, the term of this patent is extended or adjusted under 35 U.S.C. 154(b) by 377 days.

(21) Appl. No.: 15/018,074

(22) Filed: Feb. 8, 2016

(65) Prior Publication Data

US 2016/0153695 A1 Jun. 2, 2016

Related U.S. Application Data

(63) Continuation of application No. PCT/JP2014/004108, filed on Aug. 6, 2014.

(30) Foreign Application Priority Data

Aug. 9, 2013 (JP) ................................ 2013-166108

(51) Int. Cl.
*B60H 1/00* (2006.01)
*F25B 47/02* (2006.01)
(Continued)

(52) U.S. Cl.
CPC ..... *B60H 1/00328* (2013.01); *B60H 1/00921* (2013.01); *B60H 1/321* (2013.01);
(Continued)

(58) Field of Classification Search
CPC ............ B60H 1/00328; B60H 1/00921; B60H 1/3213; B60H 2001/3282; F25B 11/74;
(Continued)

(56) References Cited

U.S. PATENT DOCUMENTS

2004/0206490 A1* 10/2004 Katoh ..................... F25B 39/02 165/174
2011/0315363 A1 12/2011 Matter, III et al.
2014/0137592 A1 5/2014 Matsumoto et al.

FOREIGN PATENT DOCUMENTS

JP 04-288438 A 10/1992
JP 5-79729 A 3/1993
(Continued)

OTHER PUBLICATIONS

JP 2000-171129 (English Translation).*
(Continued)

*Primary Examiner* — Jonathan Bradford
(74) *Attorney, Agent, or Firm* — Renner, Otto, Boisselle & Sklar, LLP

(57) ABSTRACT

An exterior heat exchanger is provided with paths P1-P4. The flow rate of the air being blown by an exterior blower to pass through the path P4 closer to a refrigerant outlet of the exterior heat exchanger is set to be higher than that of the air being blown by the exterior blower to pass through the path P1 closer to a refrigerant inlet of the exterior heat exchanger. An air-conditioning controller activates cooling fans during a defrosting mode of operation.

7 Claims, 9 Drawing Sheets

(51) Int. Cl.
*B60H 1/32* (2006.01)
*F25B 13/00* (2006.01)

(52) U.S. Cl.
CPC ........... *B60H 1/3213* (2013.01); *F25B 13/00* (2013.01); *F25B 47/02* (2013.01); *B60H 2001/326* (2013.01); *B60H 2001/3277* (2013.01)

(58) Field of Classification Search
CPC ........ F25B 11/77; F25B 47/02; F25B 47/022; F25B 47/025; F25B 2700/11
See application file for complete search history.

(56) References Cited

FOREIGN PATENT DOCUMENTS

| | | | |
|---|---|---|---|
| JP | 6-221649 | A | 8/1994 |
| JP | 8-156577 | A | 6/1996 |
| JP | 2000-219037 | A | 8/2000 |
| JP | 2009-143404 | A | 7/2009 |
| JP | 2010-111222 | A | 5/2010 |
| JP | 2012-254725 | A | 12/2012 |
| WO | WO 2013/008464 | A1 | 1/2013 |

OTHER PUBLICATIONS

International Search Report for corresponding International Application No. PCT/JP2014/004108 dated Nov. 4, 2014.

Form PCT/ISA/237 for corresponding International Application No. PCT/JP2014/004108 dated Nov. 4, 2014.

* cited by examiner

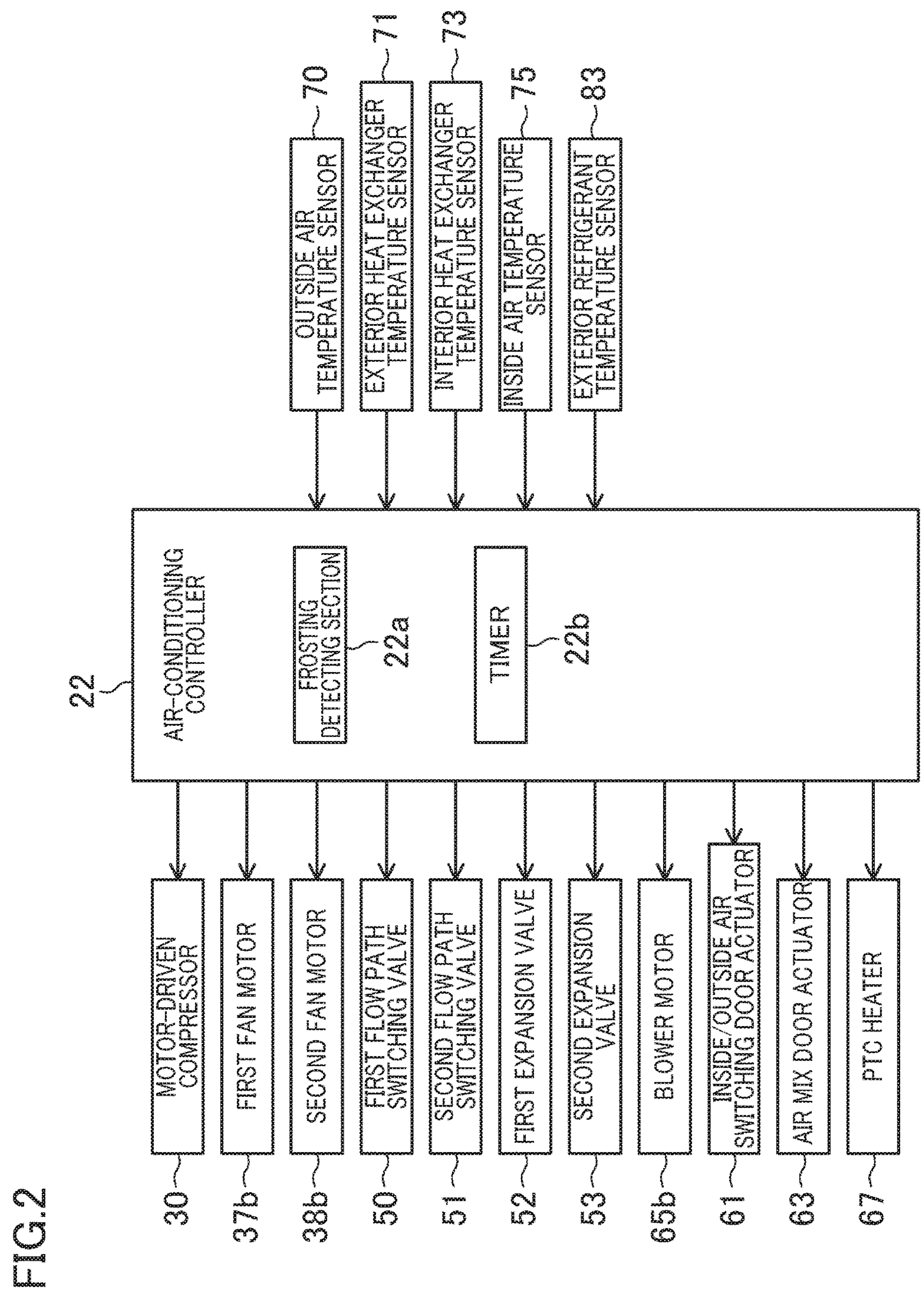
FIG.2
OUTSIDE AIR TEMPERATURE SENSOR
70
EXTERIOR HEAT EXCHANGER TEMPERATURE SENSOR
71
INTERIOR HEAT EXCHANGER TEMPERATURE SENSOR
73
INSIDE AIR TEMPERATURE SENSOR
75
EXTERIOR REFRIGERANT TEMPERATURE SENSOR
83
22
AIR-CONDITIONING CONTROLLER
FROSTING DETECTING SECTION
22a
TIMER
22b
MOTOR-DRIVEN COMPRESSOR
30
FIRST FAN MOTOR
37b
SECOND FAN MOTOR
38b
FIRST FLOW PATH SWITCHING VALVE
50
SECOND FLOW PATH SWITCHING VALVE
51
FIRST EXPANSION VALVE
52
SECOND EXPANSION VALVE
53
BLOWER MOTOR
65b
INSIDE/OUTSIDE AIR SWITCHING DOOR ACTUATOR
61
AIR MIX DOOR ACTUATOR
63
PTC HEATER
67

RIGHT
LEFT
33c
33d
37a
37b
33b
33h
33f
33a
33e
33
33g
33i
38a
38b
P1
P2
P3
P4

HEATING OPERATION MODE
HIGH-PRESSURE REFRIGERANT
LOW-PRESSURE REFRIGERANT
SUCK
DISCHARGE
1
20
21
30
31
32
33
34
37a
37b
38a
38b
40
41
42
43
44
45
46
50
51
52
53
54
55
60
60a
60b
60c
61
62
63
64
65
65a
65b
65c
65d
65e
67
68
70
71
73
75
83

1
20
21
60
60a
60b
60c
61
62
63
64
65
65a
65b
65c
65d
65e
67
31
32
73
75
50
51
52
53
54
55
40
41
42
43
44
45
46
30
34
33
37a
37b
38a
38b
68
70
71
83
SUCK
DISCHARGE
HIGH-PRESSURE REFRIGERANT
LOW-PRESSURE REFRIGERANT
DEFROSTING OPERATION MODE

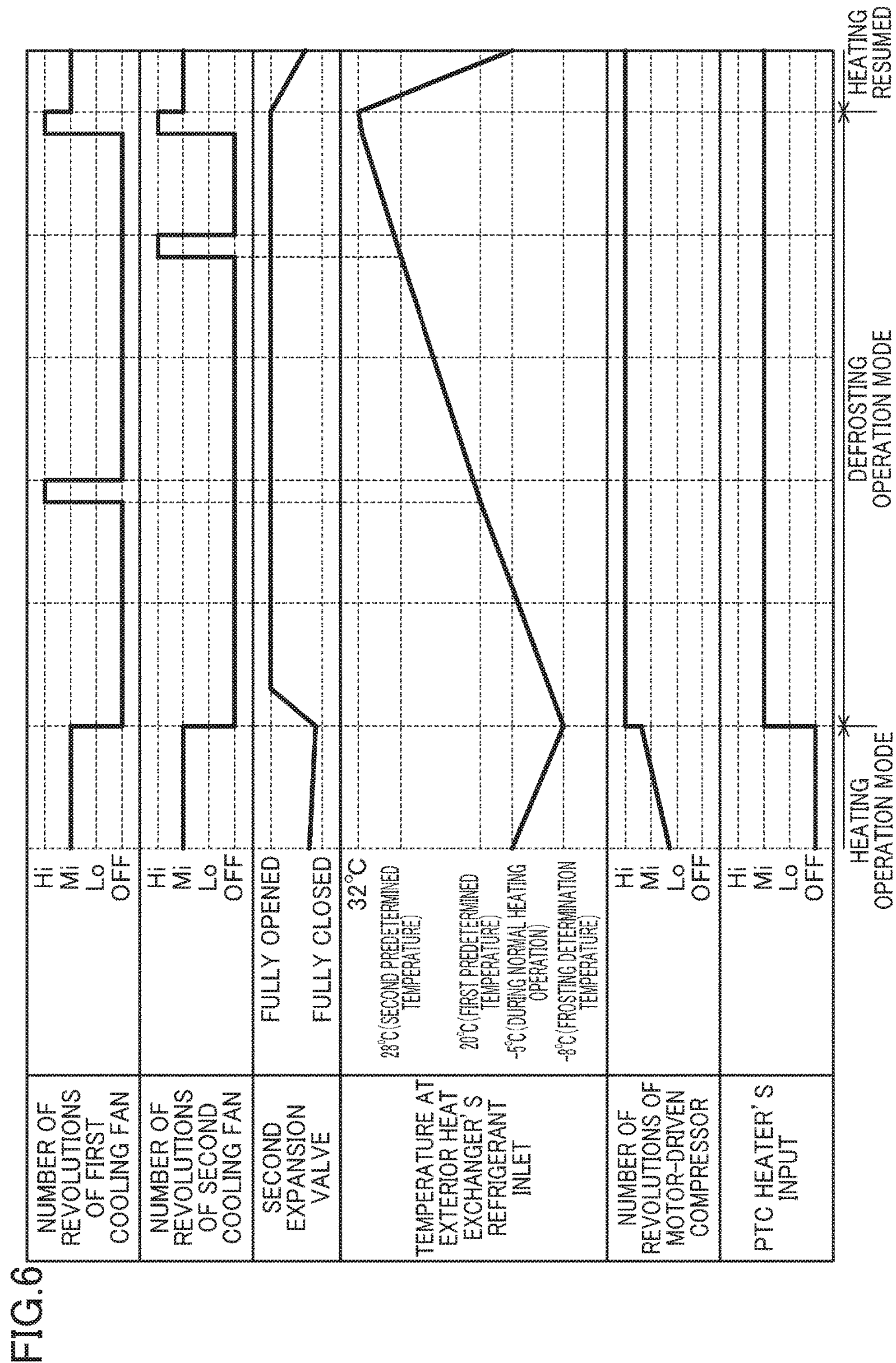
FIG.6
NUMBER OF REVOLUTIONS OF FIRST COOLING FAN
Hi
Mi
Lo
OFF
NUMBER OF REVOLUTIONS OF SECOND COOLING FAN
Hi
Mi
Lo
OFF
SECOND EXPANSION VALVE
FULLY OPENED
FULLY CLOSED
TEMPERATURE AT EXTERIOR HEAT EXCHANGER'S REFRIGERANT INLET
32°C
28°C (SECOND PREDETERMINED TEMPERATURE)
20°C (FIRST PREDETERMINED TEMPERATURE)
-5°C (DURING NORMAL HEATING OPERATION)
-8°C (FROSTING DETERMINATION TEMPERATURE)
NUMBER OF REVOLUTIONS OF MOTOR-DRIVEN COMPRESSOR
Hi
Mi
Lo
OFF
PTC HEATER'S INPUT
Hi
Mi
Lo
OFF
HEATING OPERATION MODE
DEFROSTING OPERATION MODE
HEATING RESUMED SUCK
DISCHARGE
1
20
21
30
31
32
33
34
39a
39b
40
41
42
43
44
45
46
50
51
52
53
54
55
60
60a
60b
60c
61
62
63
64
65
65a
65b
65c
65d
65e
67
68
70
71
73
75
83

33
P1
P2
P3
P4
33c
33d
33b
33h
33f
33a
33e
33g
33i
39a
39b
RIGHT
LEFT

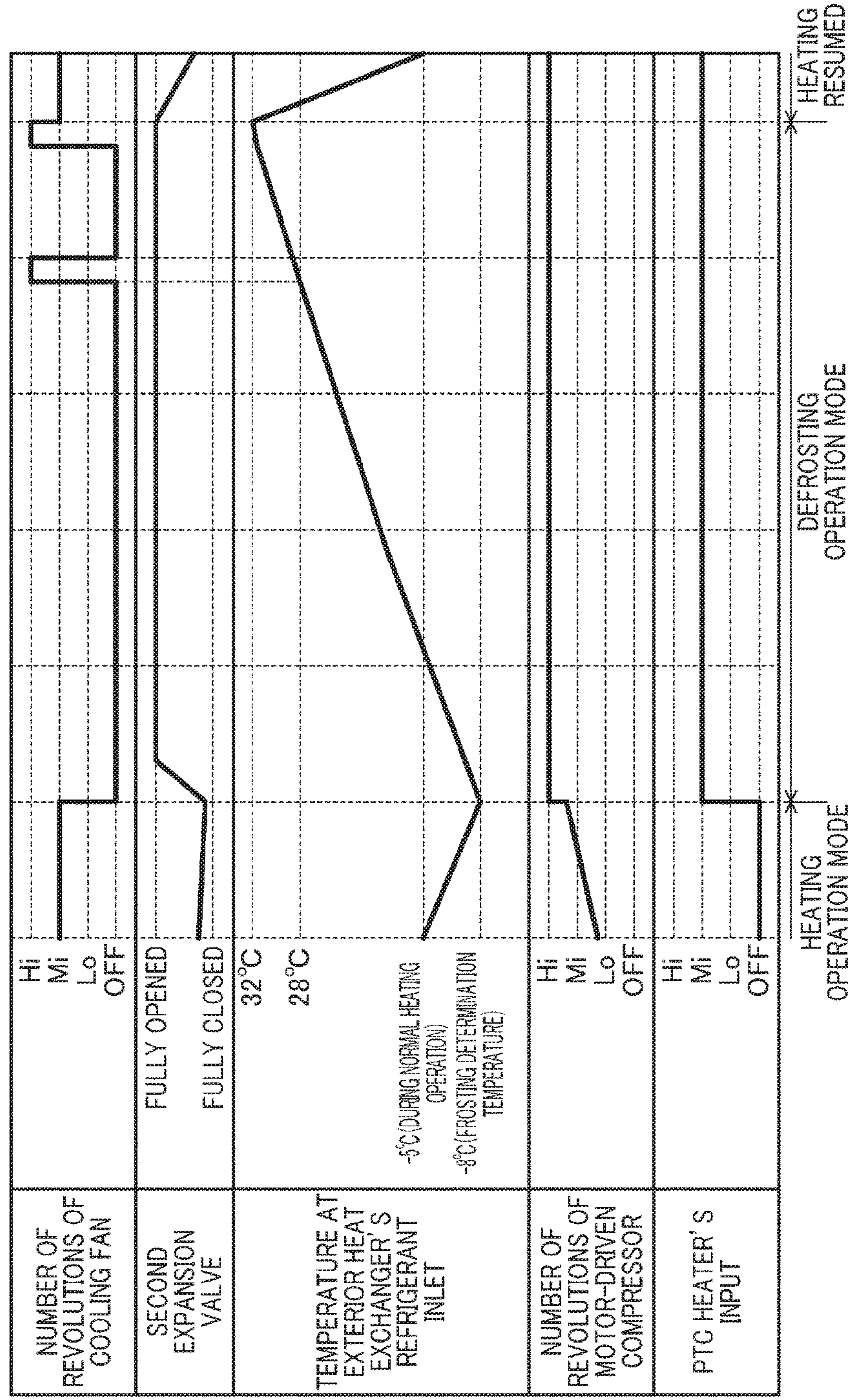
FIG.9
NUMBER OF REVOLUTIONS OF COOLING FAN
Hi
Mi
Lo
OFF
SECOND EXPANSION VALVE
FULLY OPENED
FULLY CLOSED
TEMPERATURE AT EXTERIOR HEAT EXCHANGER'S REFRIGERANT INLET
32°C
28°C
-5°C (DURING NORMAL HEATING OPERATION)
-8°C (FROSTING DETERMINATION TEMPERATURE)
NUMBER OF REVOLUTIONS OF MOTOR-DRIVEN COMPRESSOR
Hi
Mi
Lo
OFF
PTC HEATER'S INPUT
Hi
Mi
Lo
OFF
HEATING OPERATION MODE
DEFROSTING OPERATION MODE
HEATING RESUMED

VEHICLE AIR CONDITIONER

CROSS-REFERENCE TO RELATED APPLICATION

This is a continuation of International Application No. PCT/JP2014/004108 filed on Aug. 6, 2014, which claims priority to Japanese Patent Application No. 2013-166108 filed on Aug. 9, 2013. The entire disclosures of these applications are hereby incorporated by reference.

BACKGROUND

The present disclosure relates to a vehicle air conditioner including a heat pump device which performs heating and defrosting modes of operation.

A vehicle air conditioner with a heat pump device has been mounted on a car and other kinds of vehicles (see, for example, Japanese Unexamined Patent Publication No. 2010-111222). The heat pump device includes a compressor, an interior heat exchanger, an expansion valve, and an exterior heat exchanger. An interior fan to blow air toward the interior heat exchanger is provided inside the vehicle cabin, and an exterior fan to blow air toward the exterior heat exchanger is provided outside the vehicle cabin.

During heating, the interior heat exchanger functions as a radiator, and the exterior heat exchanger functions as a heat absorber. If frost is formed on the exterior heat exchanger during heating, the operation modes are switched into a defrosting operation mode to supply a high-temperature refrigerant to the exterior heat exchanger. According to Japanese Unexamined Patent Publication No. 2010-111222, the exterior fan is stopped during the defrosting mode of operation, and when the defrosting mode of operation ends, the airflow rate of the exterior fan is maximized to blow off the water deposited on the exterior heat exchanger.

While the defrosting mode of operation is being performed, the frost formed on the exterior heat exchanger melts and turns into water. However, if the exterior fan is stopped as in Japanese Unexamined Patent Publication No. 2010-111222 when the frost turns into water, the water will be left in the fins of the exterior heat exchanger and will exchange heat with a high-temperature refrigerant flowing through the heat-transfer pipe of the exterior heat exchanger to remove heat from the high-temperature refrigerant. Thus, the quantity of heat it takes to melt the frost decreases so much that it takes a long time to finish defrosting, thus affecting the comfortableness of the occupant, which is a problem. Particularly when the outside air temperature is as low as 0° C. or less, a significant quantity of heat is removed from the refrigerant to make this problem a serious one.

In addition, the exterior heat exchanger is rarely frosted uniformly, if ever, and in most cases, has an easily defrostable region and a non-easily defrostable region. Furthermore, depending on the configuration and operating state of the heat pump device, sometimes a region closer to refrigerant outlet of the exterior heat exchanger may be frosted more easily than another region closer to refrigerant inlet thereof.

In view of the foregoing background, it is therefore an object of the present disclosure to increase the occupant's comfortableness by shortening the time for defrosting with the decrease in the quantity of heat of the refrigerant minimized by draining efficiently the water collected in the exterior heat exchanger during a defrosting mode of operation.

SUMMARY

To achieve this object, according to the present disclosure, if a region closer to the refrigerant outlet of the exterior heat exchanger is frosted more easily than a region closer to the refrigerant inlet thereof, the air being blown through a path leading to the refrigerant outlet of the exterior heat exchanger has its flow rate increased during the defrosting mode of operation.

A first aspect of the present disclosure is a vehicle air conditioner comprising:

a heat pump device including a compressor which compresses a refrigerant, an interior heat exchanger provided inside a vehicle cabin, an exterior heat exchanger provided outside the vehicle cabin, an expansion valve, and an exterior blower which blows air toward the exterior heat exchanger, the heat pump device being formed by connecting together the compressor, the interior heat exchanger, the expansion valve, and the exterior heat exchanger via refrigerant piping; and an air-conditioning controller configured to control the heat pump device, the heat pump device being configured to be switched by the air-conditioning controller between multiple operation modes including a heating operation mode and a defrosting operation mode, In this air conditioner, the exterior heat exchanger includes a plurality of heat-transfer pipes which are arranged in line in a predetermined direction and a header tank which is connected to an end of the heat-transfer pipes and which extends in the direction in which the heat-transfer pipes are arranged in line, the header tank has a refrigerant inlet portion and a refrigerant outlet portion which are provided along the length of the header tank so as to be spaced apart from each other, and a partition which partitions the heat-transfer pipes into a plurality of paths such that a refrigerant flow that goes from the refrigerant inlet portion toward the refrigerant outlet portion is formed, and the flow rate of the air being blown by the exterior blower to pass through one of the paths closer to a refrigerant outlet of the exterior heat exchanger is higher than the flow rate of the air being blown by the exterior blower to pass through another one of the paths closer to a refrigerant inlet of the exterior heat exchanger.

According to this configuration, in the heating operation mode, the exterior heat exchanger absorbs heat to be frosted. In this case, depending on the configuration and operating state of the heat pump device, sometimes a path closer to the refrigerant outlet of the exterior heat exchanger may be frosted more easily than another path closer to the refrigerant inlet thereof. Meanwhile, in the defrosting operation mode, a high-temperature refrigerant is supplied to the exterior heat exchanger to melt the frost. In this case, if a lot of frost has been formed on the path closer to the refrigerant outlet of the exterior heat exchanger, then there will be a lot of water produced by the melted frost outside the path closer to the refrigerant outlet. According to the present disclosure, the flow rate of the air being blown by the exterior blower to pass through the path closer to the refrigerant outlet is higher than that of the air being blown to pass through the path closer to the refrigerant inlet, thus allowing the exterior blower to blow off efficiently the water present outside the path closer to the refrigerant outlet. This thus allows for reducing the quantity of heat removed by that outside water from the high-temperature refrigerant flowing through the heat-transfer pipes and shortening the time for defrosting.

As a means for varying the flow rate of the air flowing through the path closer to the refrigerant inlet of the exterior heat exchanger from that of the air flowing through the path closer to the refrigerant outlet thereof, the structure of a portion of the vehicle body where the exterior heat exchanger is arranged, the layout of the exterior blower, or the air blowing capacity of the exterior blower may be used, for example.

A second aspect of the present disclosure is an embodiment of the first aspect of the present disclosure. In the second aspect, the heat-transfer pipes of the exterior heat exchanger are arranged in line horizontally, and the header tank extends horizontally, the exterior blower includes a first fan and a second fan which are arranged horizontally along an air passage plane of the exterior heat exchanger so as to be located closer to the refrigerant inlet and the refrigerant outlet, respectively, and the airflow rate of the second fan is set to be higher than the airflow rate of the first fan.

That is to say, if first and second fans are provided, these fans are configured such that the air passing through a path closer to the refrigerant outlet of the exterior heat exchanger flows at the higher rate. As a result, the function and effect of the first aspect of the present disclosure are achieved reliably. In addition, by changing the airflow rates of the first and second fans, the noise is reducible with the resonance of these fans reduced. As a means for changing the airflow rates of the first and second fans, those fans may have mutually different numbers of blades or different diameters, for example.

A third aspect of the present disclosure is an embodiment of the second aspect of the present disclosure. In the third aspect, the vehicle air conditioner further comprises a frosting state detecting means for detecting a frosting state of the exterior heat exchanger, and the air-conditioning controller is configured to switch, if the frosting state detecting means senses, during the heating mode of operation, that the exterior heat exchanger is frosted, the operation modes of the heat pump device into a defrosting operation mode and to stop the first and second fans at the beginning of the defrosting mode of operation, and to activate the first and second fans independently of each other according to the degree of defrosting of the exterior heat exchanger during the defrosting mode of operation.

According to this configuration, by activating the first and second fans independently of each other according to the degree of defrosting of the exterior heat exchanger during the defrosting mode of operation, the water present outside the exterior heat exchanger may be drained efficiently, thus improving the heating performance when frosting and defrosting occur recurrently during its operation.

A fourth aspect of the present disclosure is an embodiment of the third aspect of the present disclosure. In the fourth aspect, the frosting state detecting means functions as an inlet-side refrigerant temperature detecting means for detecting a refrigerant temperature state in a region closer to the refrigerant inlet of the exterior heat exchanger, and the air-conditioning controller is configured to activate the first fan when the refrigerant temperature detected by the inlet-side refrigerant temperature detecting means exceeds a first predetermined temperature and then stop the first fan, and to activate the second fan when the refrigerant temperature detected by the inlet-side refrigerant temperature detecting means exceeds a second predetermined temperature that is higher than the first predetermined temperature.

According to this configuration, if the temperature of the refrigerant in a region closer to the refrigerant inlet of the exterior heat exchanger has risen to exceed a first predetermined temperature, then the frost on the path closer to the refrigerant inlet is estimated to have melted. In that case, by keeping the first fan activated for a predetermined period of time, the first fan is allowed to blow off the water present outside the path closer to the refrigerant inlet. This thus allows for defrosting the path closer to the refrigerant outlet quickly by supplying a high-temperature refrigerant to the path closer to the refrigerant outlet quickly.

Meanwhile, if the temperature of the refrigerant in a region closer to the refrigerant inlet of the exterior heat exchanger has risen to exceed a second predetermined temperature, then the frost on the path closer to the refrigerant outlet is estimated to have melted, too. In that case, by keeping the second fan activated for a predetermined period of time, the second fan is allowed to blow off reliably the water present outside the path closer to the refrigerant outlet.

In addition, since the inlet-side refrigerant temperature detecting means for detecting the refrigerant temperature state in a region closer to the refrigerant inlet of the exterior heat exchanger is used as a frosting state detecting means, the first and second fans are controllable with an inexpensive configuration.

A fifth aspect of the present disclosure is an embodiment of the third aspect of the present disclosure. In the fifth aspect, the frosting state detecting means functions as an outlet-side refrigerant temperature detecting means for detecting a refrigerant temperature state in a region closer to the refrigerant outlet of the exterior heat exchanger, and the air-conditioning controller is configured to activate the first fan when the refrigerant temperature detected by the outlet-side refrigerant temperature detecting means exceeds a first predetermined temperature and then stop the first fan, and to activate the second fan when the refrigerant temperature detected by the outlet-side refrigerant temperature detecting means exceeds a second predetermined temperature that is higher than the first predetermined temperature.

According to this configuration, by detecting the refrigerant temperature state in a region closer to the refrigerant outlet of the exterior heat exchanger, the frosting state of the path of the exterior heat exchanger is estimable accurately. In addition, as in the fourth aspect of the present disclosure, the first and second fans may be activated independently of each other.

A sixth aspect of the present disclosure is an embodiment of the third aspect of the present disclosure. In the sixth aspect, the frosting state detecting means functions as a clocking means for recording the amount of time that has passed since the defrosting mode of operation was started, and the air-conditioning controller is configured to activate the first fan when the clocking means senses the amount of time that has passed since the defrosting mode of operation was started exceed a first predetermined amount of time and then stop the first fan, and to activate the second fan when the clocking means senses the amount of time that has passed since the defrosting mode of operation was started exceed a second predetermined amount of time that is longer than the first predetermined amount of time.

That is to say, the longer the amount of time that has passed since the defrosting mode of operation was started, the smaller the amount of frost formed on each path of the exterior heat exchanger. That is why there is a correlation between the frosting state of each path of the exterior heat exchanger and the amount of time that has passed since the defrosting mode of operation was started. By using such a clocking means for recording the amount of time that has passed since the defrosting mode of operation was started, the frosting state may be detected based on the correlation without detecting the refrigerant temperature or any other parameter, and the first and second fans are controllable at a reduced cost adaptively to the frosting state.

A seventh aspect of the present disclosure is an embodiment of the first aspect of the present disclosure. In the seventh aspect, the exterior blower is comprised of a single fan, the fan being arranged such that the center of the fan is offset toward the refrigerant outlet of the exterior heat exchanger.

According to this configuration, when the exterior blower is activated, the flow rate of the air being blown through the path closer to the refrigerant outlet of the exterior heat exchanger becomes higher than that of the air being blown through the path closer to the refrigerant inlet. This thus allows for blowing off reliably the water present outside the path closer to the refrigerant outlet.

An eighth aspect of the present disclosure is an embodiment of any one of the first through seventh aspects of the present disclosure. In the eighth aspect, the air-conditioning controller is configured to activate the exterior blower before the operation modes of the heat pump device are switched from the defrosting operation mode into the heating operation mode and after it has been estimated that the frost on the exterior heat exchanger has melted.

According to this configuration, the water present outside the exterior heat exchanger may be blown off in a late stage of the defrosting mode of operation. This improves the heating performance while frosting and defrosting occur recurrently during the operation.

A ninth aspect of the present disclosure is an embodiment of any one of the first through eighth aspects of the present disclosure. In the ninth aspect, the air-conditioning controller controls the heat pump device such that when the heat pump device operates in the defrosting operation mode, the exterior blower has a maximum airflow rate.

According to this configuration, by setting the airflow rate of the exterior blower to be maximum during the defrosting mode of operation, the water present outside the exterior heat exchanger may be blown off reliably.

A tenth aspect of the present disclosure is an embodiment of the first aspect of the present disclosure. In the tenth aspect, the vehicle air conditioner further comprises a frosting state detecting means for detecting a frosting state of the exterior heat exchanger, the exterior blower is comprised of a single fan, and the air-conditioning controller performs control so as to switch, if the frosting state detecting means senses, during the heating mode of operation, that the exterior heat exchanger is frosted, the operation modes of the heat pump device into a defrosting operation mode and to stop the fan at the beginning of the defrosting mode of operation, and to maximize the airflow rate of the fan before the operation modes of the heat pump device are switched from the defrosting operation mode into the heating operation mode and after it has been estimated that the frost on the exterior heat exchanger has melted.

According to this configuration, the water present outside the exterior heat exchanger may be blown off in a late stage of the defrosting mode of operation. This improves the heating performance while frosting and defrosting occur recurrently during the operation.

An eleventh aspect of the present disclosure is an embodiment of any one of the first through tenth aspects of the present disclosure. In the eleventh aspect, the heat pump device includes a first interior heat exchanger and a second interior heat exchanger which is arranged upstream of the first interior heat exchanger in an airflow direction, and the heat pump device makes the first and second interior heat exchangers function as radiators during the heating mode of operation.

According to this configuration, the air-conditioning air is heated by the first and second interior heat exchangers, thus improving the heating capacity.

According to the first aspect of the present disclosure, the flow rate of the air being blown by the exterior blower to pass through the path closer to the refrigerant outlet of the exterior heat exchanger is set to be higher than that of the air being blown to pass through the path closer to the refrigerant inlet thereof such that the exterior blower is activated during the defrosting mode of operation. This thus allows for blowing off reliably the water present outside the path closer to the refrigerant outlet even when a lot of frost is formed on the path closer to the refrigerant outlet of the exterior heat exchanger. This allows for shortening the time for defrosting so much as to increase the occupant's comfortableness.

According to the second aspect of the present disclosure, by setting the flow rate of the air passing through the path closer to the refrigerant outlet of the exterior heat exchanger to be relatively high when the first and second fans are provided, the water present outside the path closer to the refrigerant outlet of the exterior heat exchanger may be blown off so much as to finish defrosting in a shorter time while noise is reduced with the resonance of the two fans suppressed.

According to the third aspect of the present disclosure, the first and second fans are activated independently of each other according to the degree of defrosting of the exterior heat exchanger, thus allowing for draining efficiently the water present outside the exterior heat exchanger. This improves the heating performance, and eventually further increases the occupant's comfortableness, when frosting and defrosting occur recurrently during the operation.

According to the fourth aspect of the present disclosure, the first and second fans may be activated appropriately enough to defrost the exterior heat exchanger quickly. In addition, since the inlet-side refrigerant temperature detecting means for detecting the refrigerant temperature state in a region closer to the refrigerant inlet of the exterior heat exchanger is used as a frosting state detecting means, the first and second fans are controllable with an inexpensive configuration.

According to the fifth aspect of the present disclosure, the refrigerant temperature state in a region closer to the refrigerant outlet of the exterior heat exchanger is detected, thus allowing for estimating the frosting state of the path of the exterior heat exchanger accurately. In addition, the first and second fans may be activated even more appropriately.

According to the sixth aspect of the present disclosure, a clocking means for recording the amount of time that has passed since the defrosting mode of operation was started is used, thus allowing for controlling the first and second fans at a reduced cost adaptively to the frosting state of the exterior heat exchanger without detecting the refrigerant temperature or any other parameter.

According to the seventh aspect of the present disclosure, the fan is arranged so as to be offset toward a region closer to refrigerant outlet of the exterior heat exchanger, which allows for blowing off reliably the water present outside the path closer to the refrigerant outlet. This improves the heating performance, and eventually further increases the occupant's comfortableness, when frosting and defrosting occur recurrently during the operation.

According to the eighth aspect of the present disclosure, the exterior blower is activated before the operation modes are switched from the defrosting operation mode into the heating operation mode and after the frost formed on the exterior heat exchanger has melted, thus allowing for blowing off the water present outside the exterior heat exchanger in a late stage of the defrosting mode of operation. This improves the heating performance while frosting and defrosting occur recurrently during the operation.

According to the ninth aspect of the present disclosure, the airflow rate of the exterior blower is set to be maximum during the defrosting mode of operation, thus allowing for blowing off reliably the water present outside the exterior heat exchanger. This improves the heating performance while frosting and defrosting occur recurrently during the operation.

According to the tenth aspect of the present disclosure, the water present outside the exterior heat exchanger may be blown off in a late stage of the defrosting mode of operation. This improves the heating performance while frosting and defrosting occur recurrently during the operation.

According to the eleventh aspect of the present disclosure, the first and second interior heat exchangers are made to function as radiators during the heating mode of operation, thus improving the heating capacity.

BRIEF DESCRIPTION OF THE DRAWINGS

FIG. 2 is a block diagram of the vehicle air conditioner.

FIG. 6 is a timing diagram showing the details of control performed by the vehicle air conditioner.

FIG. 9 is a diagram illustrating the second embodiment and corresponding to FIG. 6.

DETAILED DESCRIPTION

Embodiments of the present disclosure will now be described in detail with reference to the accompanying drawings. Note that the following description of preferred embodiments is only an example in nature and is not intended to limit the scope, applications, or use of the present disclosure.

First Embodiment

Figure 1:
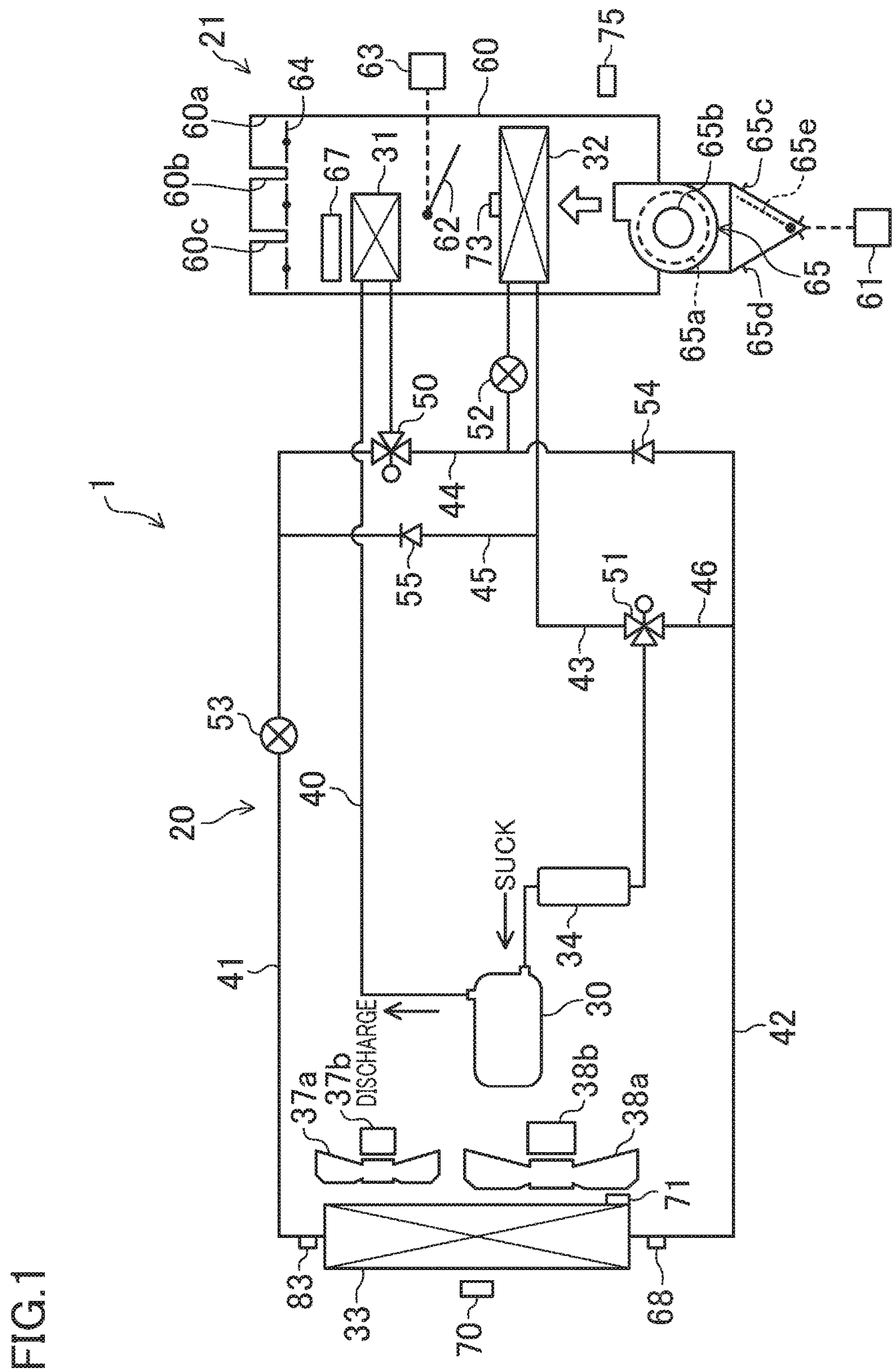
FIG. 1 is a diagram illustrating a general configuration for a vehicle air conditioner according to a first embodiment.

FIG. 1 illustrates a general configuration for a vehicle air conditioner 1 according to a first embodiment of the present disclosure. A vehicle on which the vehicle air conditioner 1 is mounted may be an electric car including a traction battery (not shown) and a traction motor (not shown).

This vehicle air conditioner 1 includes a heat pump device 20, an interior air-conditioning unit 21, and an air-conditioning controller 22 (shown in FIG. 2) that controls the heat pump device 20 and the interior air-conditioning unit 21.

The heat pump device 20 includes: a motor-driven compressor 30 that compresses a refrigerant; a downstream interior heat exchanger (first interior heat exchanger) 31 provided inside the vehicle cabin; an upstream interior heat exchanger (second interior heat exchanger) 32 provided upstream of the downstream interior heat exchanger 31 in an airflow direction inside the vehicle cabin; an exterior heat exchanger 33 provided outside the vehicle cabin; an accumulator 34; first to fourth main refrigerant pipes 40-43 and first to third branch refrigerant pipes 44-46 that connect all of these members 30 to 34 together; and first and second cooling fans 37*a*, 38*a* that form an exterior blower.

The motor-driven compressor 30 is an onboard compressor which has been known in the art, and is driven by an electric motor. The motor-driven compressor 30 may have its discharge rate per unit time varied by having its number of revolutions changed. The motor-driven compressor 30 is connected to the air-conditioning controller 22 so as to have its ON/OFF states switched and its number of revolutions controlled. The motor-driven compressor 30 is supplied with power from the traction battery.

The exterior heat exchanger 33 is provided near the front end of a motor room (corresponding to the engine room of an engine-driven vehicle) in a front portion of a vehicle, and is configured to catch the wind blowing against the vehicle traveling.

Figure 3:
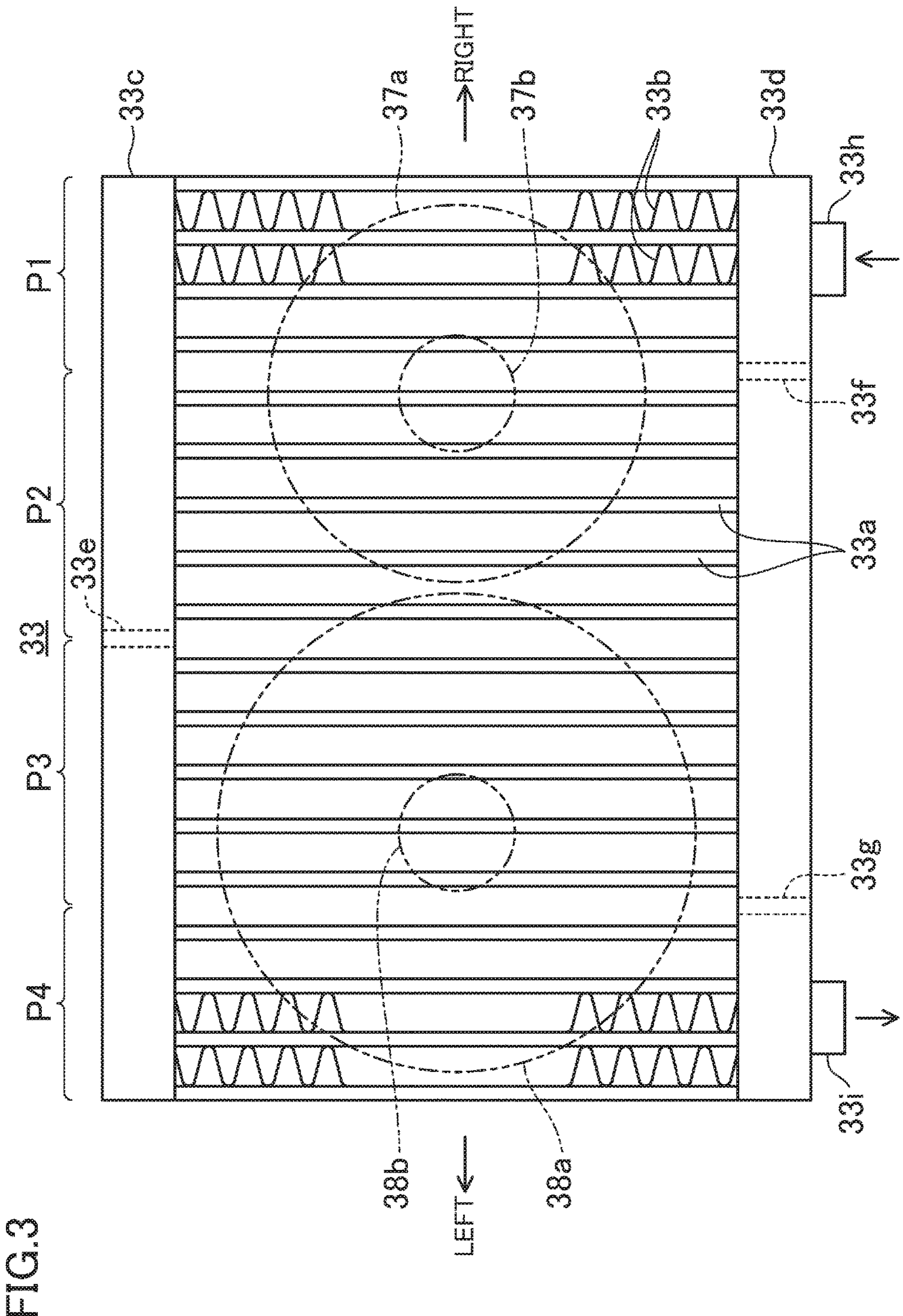
FIG. 3 is a rear view of an exterior heat exchanger as viewed from the rear side of the vehicle.

As shown in FIG. 3, the exterior heat exchanger 33 includes a plurality of heat-transfer pipes 33*a*, a plurality of fins 33*b*, an upper header tank 33*c*, and a lower header tank 33*d*. The heat-transfer pipes 33*a* run vertically and are arranged side by side laterally (i.e., horizontally) through the vehicle. Each of these heat-transfer pipes 33*a* has a cross section elongated in the direction in which the outside air passes through (i.e., the direction pointing from the front end to the rear end of the vehicle). Each pair of horizontally adjacent heat-transfer pipes 33*a*, 33*a* are horizontally spaced apart from each other to leave a space for disposing one of the fins 33*b*. That is to say, one of the fins 33*b* is provided between each pair of adjacent heat-transfer pipes 33*a*, 33*a*. The fin 33*b* may be a corrugated fin extending from the vicinity of the upper end of the heat-transfer pipe 33*a* to the vicinity of the lower end thereof.

The upper header tank 33*c* communicates with the respective upper ends of the heat-transfer pipes 33*a*. The upper header tank 33*c* has such a shape as extending laterally through the vehicle in the direction in which those heat-transfer pipes 33*a* are arranged side by side. A first partition plate (partition portion) 33*e* is provided inside, and in the middle of the length direction of, the upper header tank 33*c*. This first partition plate 33*e* is provided to partition the inside of the upper header tank 33*c* into a space on one side of the length direction and a space on the other side of the length direction.

The lower header tank 33*d* communicates with the respective lower ends of the heat-transfer pipes 33*a*. Just like the upper header tank 33*c*, the lower header tank 33*d* also has such a shape as extending laterally through the vehicle. A second partition plate (partition portion) 33*f* is provided on the right hand side of the middle of the length direction of, and inside, the lower header tank 33*d*, and a third partition plate (partition portion) 33*g* is provided on the left hand side of the middle. The second and third partition plates 33*f* and 33*g* are provided to partition the inside of the lower header tank 33*d* into three spaces in the length direction.

In addition, the lower header tank 33*d* is further provided with a refrigerant inlet pipe (refrigerant inlet portion) 33*h* to let a refrigerant flow into the lower header tank 33*d* and a refrigerant outlet pipe (refrigerant outlet portion) 33*i* to let the refrigerant flow out of the lower header tank 33*d*. These two pipes 33*h* and 33*i* are spaced apart from each other in the length direction of the lower header tank 33*d*. The refrigerant inlet pipe 33*h* communicates with the space of the lower header tank 33*d* on the right hand side of the second partition plate 33*f*, while the refrigerant outlet pipe 33*i* communicates with the space of the lower header tank 33*d* on the left hand side of the third partition plate 33*g*.

In this exterior heat exchanger 33, first through fourth paths P1-P4 are formed by the first, second, and third partition plates 33*e*, 33*f*, and 33*g*. Specifically, the first path P1 is comprised of a group of heat-transfer pipes 33*a* that communicate with the space of the lower header tank 33*d* on the right hand side of the second partition plate 33*f* The second path P2 is comprised of a group of heat-transfer pipes 33*a* that communicate with the space of the lower header tank 33*d* on the left hand side of the second partition plate 33*f* and with the space of the upper header tank 33*c* on the right hand side of the first partition plate 33*e*. The third path P3 is comprised of a group of heat-transfer pipes 33*a* that communicate with the space of the lower header tank 33*d* on the right hand side of the third partition plate 33*g* and with the space of the upper header tank 33*c* on the left hand side of the first partition plate 33*e*. The fourth path P4 is comprised of a group of heat-transfer pipes 33*a* that communicate with the space of the lower header tank 33*d* on the left hand side of the third partition plate 33*g*.

The first path P1 serves as a path most upstream in the refrigerant flow direction, and is followed by the second, third and fourth paths P2, P3 and P4 in this order in the refrigerant flow direction. That is to say, the first, second, and third partition plates 33*e*, 33*f* and 33*g* are provided to classify the heat-transfer pipes 33*a* into the plurality of paths P1-P4 so as to form a refrigerant flow that goes from the refrigerant inlet pipe 33*h* toward the refrigerant outlet pipe 33*i*.

As shown in FIG. 1, the first and second cooling fans 37*a* and 38*a* are laterally arranged side by side on the front end of the vehicle and along the air passage plane so as to be located closer to the rear end of the vehicle than the exterior heat exchanger 33 is (i.e., downstream of the exterior heat exchanger 33 in the wind blowing against the vehicle travelling). The first and second cooling fans 37*a* and 38*a* are driven by first and second fan motors 37*b*, 38*b*, respectively, and are configured to blow air against the exterior heat exchanger 33 from the front end of the vehicle toward the rear end thereof.

As shown in FIG. 3, the first cooling fan 37*a* is arranged such that its center is offset rightward with respect to the lateral center of the exterior heat exchanger 33. On the other hand, the second cooling fan 38*a* is arranged such that its center is offset leftward with respect to the lateral center of the exterior heat exchanger 33.

The flow rate of the air being blown by the second cooling fan 38*a* is set to be higher than that of the air being blown by the first cooling fan 37*a* having the same number of revolutions. As a result, the flow rate of the air being blown by the second cooling fan 38*a* to pass through the paths P3 and P4 closer to the refrigerant outlet of the exterior heat exchanger 33 is set to be higher than that of the air being blown by the first cooling fan 37*a* to pass through the paths P1 and P2 closer to the refrigerant inlet of the exterior heat exchanger 33.

Specifically, in this embodiment, the diameter of the second cooling fan 38*a* is set to be larger than that of the first cooling fan 37*a*. This allows for reducing the resonance even when the first and second cooling fans 37*a* and 38*a* are activated simultaneously while providing the air speed distribution described above. As a result, the noise is reduced.

Note that the first and second cooling fans 37*a* and 38*a* do not have to have their airflow rate differentiated by adopting such a configuration in which their diameters are set to be different ones. Alternatively, their airflow rate may also be differentiated by providing mutually different numbers of blades for the first and second cooling fans 37*a* and 38*a* as well. Still alternatively, the first and second cooling fans 37*a* and 38*a* may also have their airflow rate differentiated even by adopting a vehicle structure in which it is more difficult for the air to flow into, or out of, the first cooling fan 37*a* than the second cooling fan 38*a*. Optionally, these configurations may also be adopted in any arbitrary combination.

The first and second fan motors 37*b* and 38*b* are connected to the air-conditioning controller 22 and configured to have their ON/OFF states switched and their number of revolutions controlled independently of each other. The numbers of revolutions may be changed into any of the three stages of Lo (low), Mi (middle) and Hi (highest) speeds. However, the numbers of revolutions may also be changed from one of two stages into the other or any one of four or more stages into another, or may even be changed stagelessly.

The first and second fan motors 37*b*, 38*b* are also supplied with electric power from the traction battery. Note that the first and second fan motors 37*b*, 38*b* may also blow air to a radiator (not shown) that cools a traction inverter, for example, and may also be activated even if air conditioning is not requested.

As shown in FIG. 1, the first main refrigerant pipe 40 connects together the discharge port of the motor-driven compressor 30 and the refrigerant inlet of the downstream interior heat exchanger 31. The second main refrigerant pipe 41 connects together the refrigerant outlet of the downstream interior heat exchanger 31 and the refrigerant inlet pipe 33*h* of the exterior heat exchanger 33. The third main refrigerant pipe 42 connects together the refrigerant outlet pipe 33*g* of the exterior heat exchanger 33 and the refrigerant inlet of the upstream interior heat exchanger 32. The fourth main refrigerant pipe 43 connects together the refrigerant outlet of the upstream interior heat exchanger 32 and the suction port of the motor-driven compressor 30.

The accumulator 34 is provided near the suction port of the motor-driven compressor 30 and halfway along the fourth main refrigerant pipe 43.

The first branch refrigerant pipe 44 branches from the second main refrigerant pipe 41, and is connected to the third main refrigerant pipe 42. The second branch refrigerant pipe 45 branches from the second main refrigerant pipe 41, and is connected to the fourth main refrigerant pipe 43. The third branch refrigerant pipe 46 branches from the third main refrigerant pipe 42, and is connected to the fourth main refrigerant pipe 43.

The heat pump device 20 further includes a first flow path switching valve 50, a second flow path switching valve 51, a first expansion valve 52, a second expansion valve 53, a first check valve 54, and a second check valve 55.

The first flow path switching valve 50 and the second flow path switching valve 51 are configured as electric three-way valves, and are controlled by the air-conditioning controller 22. The first flow path switching valve 50 is provided halfway along the second main refrigerant pipe 41, and the first branch refrigerant pipe 44 is connected to the valve 50. The second flow path switching valve 51 is provided halfway along the fourth main refrigerant pipe 43, and the third branch refrigerant pipe 46 is connected to the valve 51.

The first and second expansion valves 52 and 53 are electric types to be controlled by the air-conditioning controller 22 to operate in an opening direction and a closing direction. The degrees of opening of the first and second expansion valves 52 and 53 are ordinarily set according to the condition of the air-conditioning load, but may also be set to be any arbitrary degrees irrespective of the air-conditioning load.

The first expansion valve 52 is provided closer to the upstream interior heat exchanger 32 than the point of connection between the third main refrigerant pipe 42 and the first branch refrigerant pipe 44 is, i.e., provided on a refrigerant pipe leading to the refrigerant inlet of the upstream interior heat exchanger 32. On the other hand, the second expansion valve 53 is provided on the second main refrigerant pipe 41.

The first check valve 54 is provided on the third main refrigerant pipe 42, and is configured to allow the refrigerant to flow through the third main refrigerant pipe 42 from the exterior heat exchanger 33 toward the upstream interior heat exchanger 32 and to prevent the refrigerant from flowing in the reverse direction.

The second check valve 55 is provided on the second branch refrigerant pipe 45, and is configured to allow the refrigerant to flow through the second branch refrigerant pipe 45 from the fourth main refrigerant pipe 43 toward the second main refrigerant pipe 41 and to prevent the refrigerant from flowing in the reverse direction.

The interior air-conditioning unit 21 further includes a casing 60 housing the downstream and upstream interior heat exchangers 31 and 32, an air mix door (temperature controlling door) 62, an air mix door actuator 63 that drives the air mix door 62, blowout-mode switching doors 64, a blower 65, and a PTC heater (electric heater) 67.

The blower 65 is provided to select one of the air inside the vehicle cabin (inside air) or the air outside the vehicle cabin (outside air) and blow the selected air as air-conditioning air into the casing 60. The blower 65 includes a sirocco fan 65*a* and a blower motor 65*b* that drives the sirocco fan 65*a* in rotation. The blower motor 65*b* is connected to the air-conditioning controller 22 to have its ON/OFF states switched and its number of revolutions controlled. The blower motor 65*b* is also supplied with electric power from the traction battery.

The blower 65 is provided with an inside air inlet port 65*c* to introduce the inside air and an outside air inlet port 65*d* to introduce the outside air. Inside the blower 65, provided is an inside/outside air switching door 65*e* to open one of the inside and outside air inlet ports 65*c* and 65*d* and close the other. The blower 65 is further provided with an inside/outside air switching door actuator 61 to drive the inside/outside air switching door 65*e*. This inside/outside air switching door actuator 61 is controlled by the air-conditioning controller 22. The blower 65 is configured to have its air introducing modes switched between an inside air introducing mode in which the inside air inlet port 65*c* is fully opened and the outside air inlet port 65*d* is fully closed and an outside air introducing mode in which the inside air inlet port 65*c* is fully closed and the outside air inlet port 65*d* is fully opened. The blower 65 is configured to allow the occupant to select either one of the inside and outside air introducing modes by turning a switch.

The casing 60 is provided inside an instrument panel (not shown) in the vehicle cabin. The casing 60 has a defroster blowout port 60*a*, a vent blowout port 60*b*, and a heat blowout port 60*c*. The defroster blowout port 60*a* is provided to supply the air-conditioning air to the inner surface of the windshield in the vehicle cabin. The vent blowout port 60*b* is provided to supply the air-conditioning air to mainly the upper body of the occupant in the vehicle cabin. The heat blowout port 60*c* is provided to supply the air-conditioning air to the feet of the occupant in the cabin.

These blowout ports 60*a*-60*c* are each opened and closed by an associated one of the blowout-mode switching doors 64. Although not shown, the blowout-mode switching doors 64 are operated by an actuator connected to the air-conditioning controller 22.

Examples of the blowout modes include a defroster blowout mode in which the air-conditioning air is supplied to the defroster blowout port 60*a*, a vent blowout mode in which the air-conditioning air is supplied to the vent blowout port 60*b*, a heat blowout mode in which the air-conditioning air is supplied to the heat blowout port 60*c*, a defroster/heat mode in which the air-conditioning air is supplied to the defroster blowout port 60*a* and the heat blowout port 60*c*, and a bi-level mode in which the air-conditioning air is supplied to the vent blowout port 60*b* and the heat blowout port 60*c*.

All of the air-conditioning air introduced into the casing 60 passes through the upstream interior heat exchanger 32.

In the casing 60, the air mix door 62 is provided between the upstream and downstream interior heat exchangers 32 and 31. The air mix door 62 is provided to control the temperature of the air-conditioning air such that the air that has passed through the upstream interior heat exchanger 32 which is going to pass through the downstream interior heat exchanger 31 has its flow rate changed to determine a mixing ratio between the air that has passed through the upstream interior heat exchanger 32 and the air that has passed through the downstream interior heat exchanger 31.

The PTC heater 67 is arranged downstream of the downstream interior heat exchanger 31 in the airflow direction inside the casing 60 in order to heat the air-conditioning air flowing inside the casing 60. The PTC heater 67 is controlled by the air-conditioning controller 22 so as to have its ON/OFF states switched and have the degree of heating changed. In this embodiment, the degree of heating is supposed to be changed from one of the three stages of Lo (low), Mi (middle) and Hi (high) into another. However, the degree of heating may also be changed in a larger number of stages or may even be changed stagelessly. The PTC heater 67 is supplied with electric power from the traction battery.

The vehicle air conditioner 1 further includes an outside air temperature sensor 70, an exterior heat exchanger temperature sensor 71, an interior heat exchanger temperature sensor 73, an inside air temperature sensor 75, and an exterior refrigerant temperature sensor (inlet-side refrigerant temperature detecting means) 83. These sensors are connected to the air-conditioning controller 22.

The outside air temperature sensor 70 is provided upstream of the exterior heat exchanger 33 in the airflow direction in order to detect the temperature of the outside air (outside air temperature) that has not entered the exterior heat exchanger 33 yet. On the other hand, the exterior heat exchanger temperature sensor 71 is arranged on a surface of the exterior heat exchanger 33 which is located downstream in the airflow direction in order to detect a surface temperature of the exterior heat exchanger 33.

The interior heat exchanger temperature sensor 73 is provided downstream of the upstream interior heat exchanger 32 in the airflow direction in order to detect a surface temperature of the upstream interior heat exchanger 32.

The inside air temperature sensor 75 is provided to detect the temperature inside the vehicle cabin (the inside air temperature) and is arranged at a predetermined position inside the vehicle cabin. The inside air temperature sensor 75 is a sensor that has been known in the art, and a detailed description thereof will be omitted herein.

The exterior refrigerant temperature sensor 83 is provided for the refrigerant inlet pipe 33*h* of the exterior heat exchanger 33 to detect the temperature of the refrigerant in the refrigerant inlet pipe 33*h* of the exterior heat exchanger 33.

Although not shown, the vehicle air conditioner 1 also includes a solar radiation sensor and other kinds of sensors.

The air-conditioning controller 22 is configured to control the heat pump device 20 and other components by reference to multiple pieces of information including the temperature set by the occupant, the outside air temperature, the temperature inside the vehicle cabin, and the intensity of solar radiation. The air-conditioning controller 22 may be implemented as a well-known central processing unit (CPU), a ROM, or a RAM, for example. In addition, the air-conditioning controller 22 further controls the motor-driven compressor 30, the first and second fan motors 37*b*, 38*b*, and other members depending on the air-conditioning load.

As in an ordinary automatic air-conditioning control, the air-conditioning controller 22 controls, through a main routine, a switch of the operation modes of the heat pump device 20, the volume of the air to be blown by the blower 65, the degree of opening of the air mix door 62, a switch of the blowout modes, the motor-driven compressor 30, and the blower motor 65*b*. For example, the fan motors 37*b*, 38*b* are activated even if the motor-driven compressor 30 is at a stop, e.g., when the traction inverter or any other member needs to be cooled.

The heat pump device 20 has a plurality of operation modes including a heating operation mode and a defrosting operation mode. Although not described for this embodiment, the operation modes of the heat pump device 20 also include a cooling operation mode in which the downstream interior heat exchanger 31 is made to function as a radiator, the upstream interior heat exchanger 32 is made to function as a heat absorber, and the exterior heat exchanger 33 is made to function as a radiator.

Figure 4:
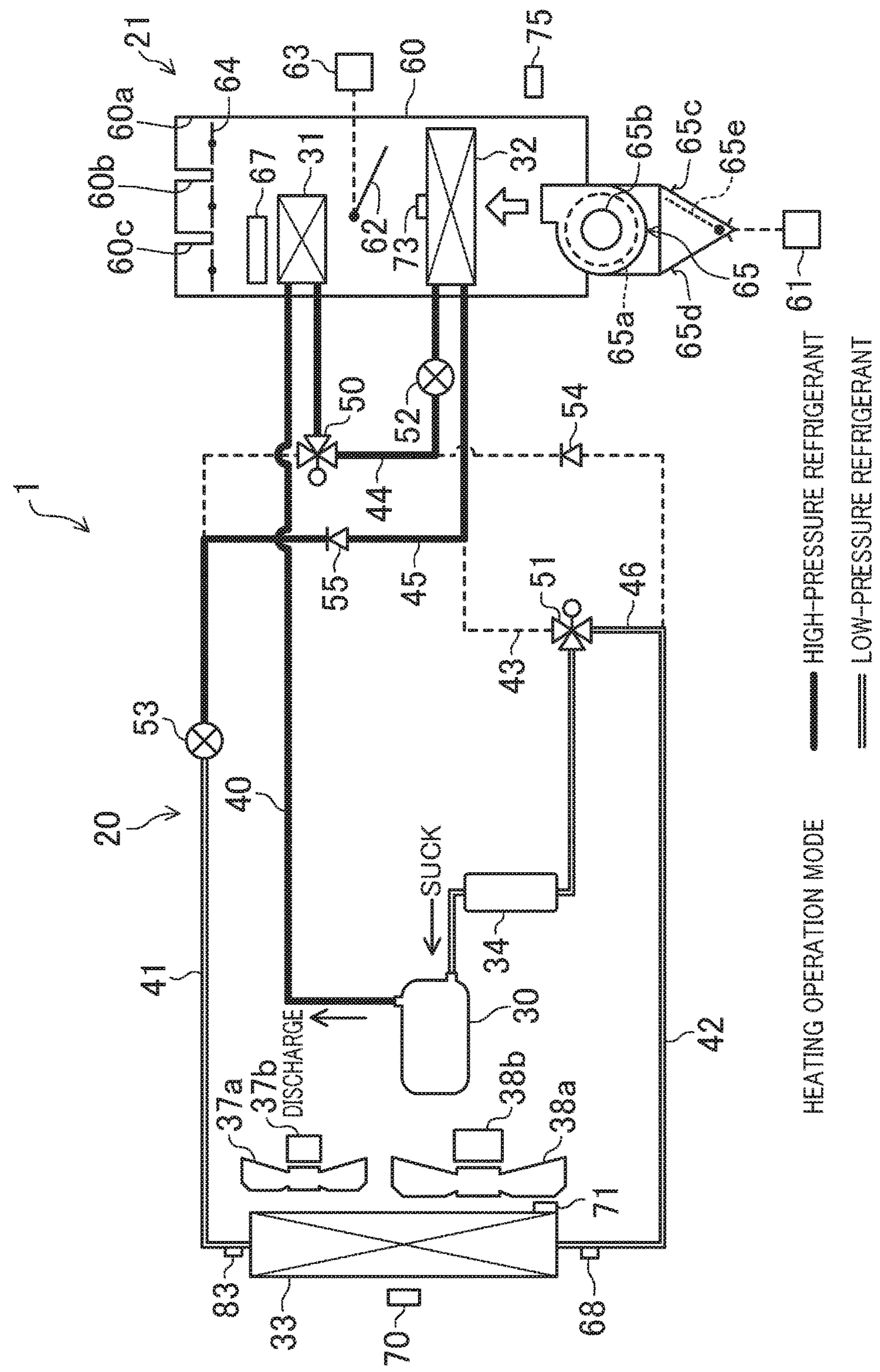
FIG. 4 is a diagram illustrating a heating mode of operation and corresponding to FIG. 1.

The heating operation mode shown in FIG. 4 is selected when the outside air temperature is lower than 0° C. (at an extremely-low outside air temperature), for example. In the heating operation mode, the downstream and upstream interior heat exchangers 31 and 32 are made to function as radiators, and the exterior heat exchanger 33 is made to function as a heat absorber.

Specifically, the first flow path switching valve 50 switches the flow paths such that the refrigerant that has flowed out of the downstream interior heat exchanger 31 flows into the upstream interior heat exchanger 32 through the inlet thereof. Meanwhile, the second flow path switching valve 51 switches the flow paths such that the refrigerant that has flowed out of the exterior heat exchanger 33 flows into the accumulator 34. The first expansion valve 52 is opened to turn into a non-expansion state, and the second expansion valve 53 is half-closed to turn into an expansion state.

If the motor-driven compressor 30 is activated in this state, the high-pressure refrigerant discharged from the motor-driven compressor 30 flows into the downstream interior heat exchanger 31 through the first main refrigerant pipe 40, and circulates through the downstream interior heat exchanger 31. The refrigerant that has circulated through the downstream interior heat exchanger 31 flows through the second main refrigerant pipe 41 into the upstream interior heat exchanger 32 via the first branch refrigerant pipe 44. Then, the refrigerant circulates through the upstream interior heat exchanger 32. That is, since the high-temperature refrigerant flows into the downstream and upstream interior heat exchangers 31 and 32, the air-conditioning air is heated by both of the downstream and upstream interior heat exchangers 31 and 32. As a result, a high heating capacity is achieved.

The refrigerant that has circulated through the upstream interior heat exchanger 32 flows through the fourth main refrigerant pipe 43 into the second main refrigerant pipe 41 via the second branch refrigerant pipe 45. The refrigerant that has flowed into the second main refrigerant pipe 41 expands by passing through the second expansion valve 53, and then flows into the exterior heat exchanger 33. The refrigerant that has flowed into the exterior heat exchanger 33 absorbs heat from the outside air. Then, the refrigerant passes through the third main refrigerant pipe 42 and the third branch refrigerant pipe 46 in this order, and is sucked into the motor-driven compressor 30 by way of the accumulator 34.

Figure 5:
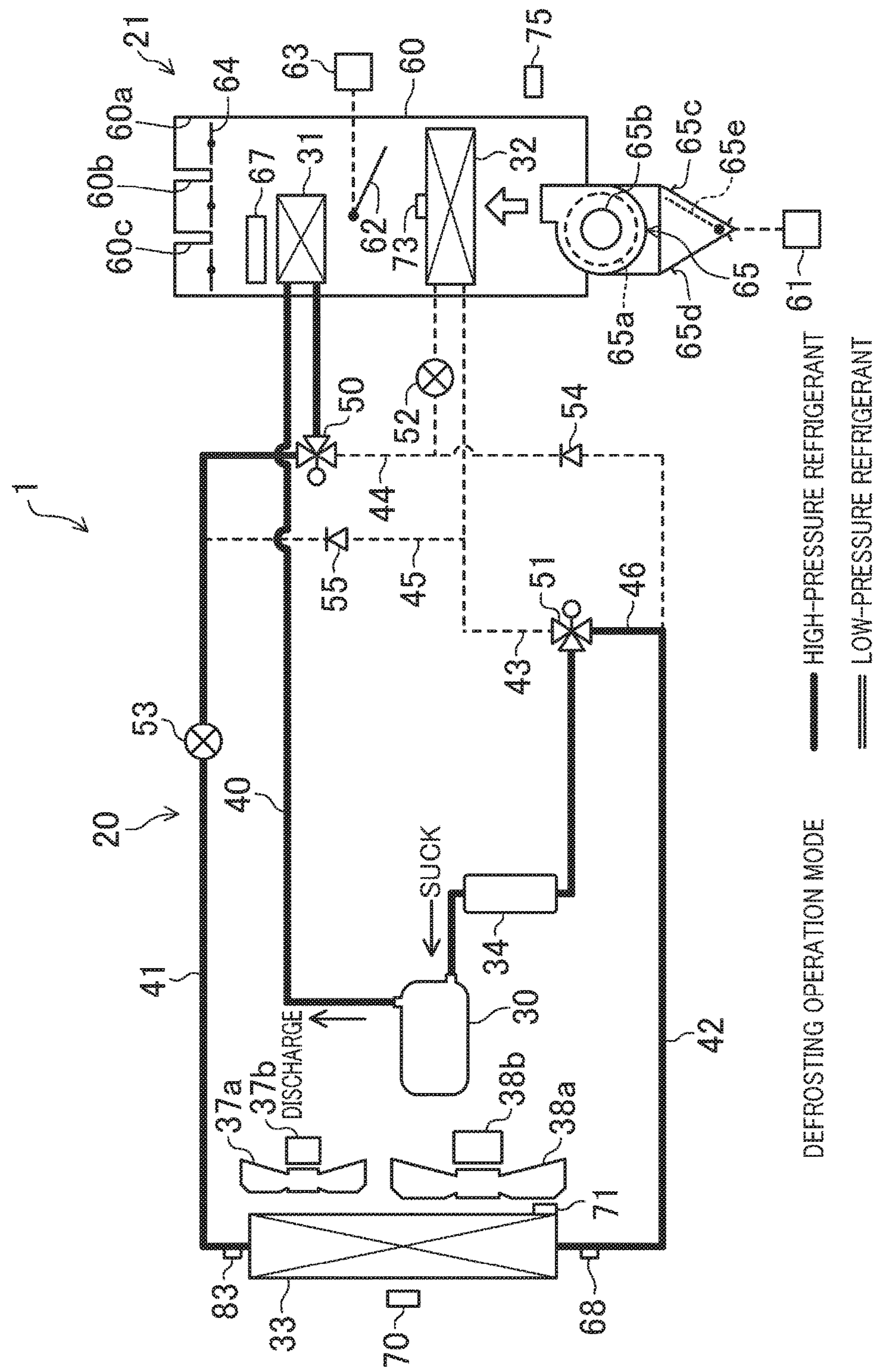
FIG. 5 is a diagram illustrating a defrosting mode of operation and corresponding to FIG. 1.

The defrosting operation mode shown in FIG. 5 is selected in order to melt the frost formed, if any, in the exterior heat exchanger 33 during heating. In the defrosting operation mode, the downstream interior heat exchanger 31 and the exterior heat exchanger 33 are made to function as radiators, and no refrigerant is allowed to flow through the upstream interior heat exchanger 32.

Specifically, the first flow path switching valve 50 switches the flow paths so as to prevent the refrigerant that has flowed out of the downstream interior heat exchanger 31 from flowing into the upstream interior heat exchanger 32 through its inlet and to allow the refrigerant to flow toward the second expansion valve 53. Meanwhile, the second flow path switching valve 51 switches the flow paths so as to allow the refrigerant that has flowed out of the exterior heat exchanger 33 to flow into the accumulator 34. The second expansion valve 53 is turned into the non-expansion state.

If the motor-driven compressor 30 is activated in this state, the refrigerant discharged from the motor-driven compressor 30 circulates through the downstream interior heat exchanger 31, and then flows into the exterior heat exchanger 33 without expanding by passing through the second main refrigerant pipe 41. The refrigerant that has flowed into the exterior heat exchanger 33 dissipates heat to melt the frost there. Thereafter, the refrigerant passes through the third main refrigerant pipe 42 and the third branch refrigerant pipe 46 in this order and then is sucked into the motor-driven compressor 30 via the accumulator 34.

As shown in FIG. 2, the air-conditioning controller 22 includes a frosting detecting section (frosting state detecting means) 22*a* which determines whether or not frost has been formed in the exterior heat exchanger 33 and how much frost has been formed there, if any. The frosting detecting section 22*a* is configured to determine whether or not frost has been formed in the exterior heat exchanger 33 by making the exterior refrigerant temperature sensor 83 detect the temperature of the refrigerant in the refrigerant inlet pipe 33*h* of the exterior heat exchanger 33. Specifically, in the normal heating operation mode, the temperature of the refrigerant in the refrigerant inlet pipe 33*h* of the exterior heat exchanger 33 may be approximately −5° C., for example. In this embodiment, when the temperature of the refrigerant in the refrigerant inlet pipe 33*h* is sensed to have decreased to −8° C., for example, the decision is made that frost has been formed in the exterior heat exchanger 33. The decision may be made that the lower the temperature of the refrigerant in the refrigerant inlet pipe 33*h*, the larger the amount of frost formed there should be.

Alternatively, the frosting detecting section 22*a* may also be configured to determine whether or not frost has been formed in the exterior heat exchanger 33 by making the outlet-side temperature sensor (outlet-side refrigerant temperature detecting means) 68 detect the temperature of the refrigerant in the outlet pipe 33*i* using the refrigerant in the exterior heat exchanger 33, for example. Even so, the decision may also be made in the same way as in a situation where the temperature is detected by the exterior refrigerant temperature sensor 83.

The target blowout temperature of the air being blown out from the interior air-conditioning unit 21 is calculated by the air-conditioning controller 22 based on the temperature set by the occupant and the outside air temperature, for example.

Next, the procedure of control to be performed by the air-conditioning controller 22 will be described. Although not shown, in the main routine, if the outside air temperature (TG) detected by the outside air temperature sensor 70 is lower than 0° C., for example, the operation modes of the heat pump device 20 are switched into the heating operation mode. Also, the air-mix door 62 is operated so that the temperature of the blown air becomes as high as the target temperature.

If the outside air temperature (TG) is within the range of 0° C. to 25° C., for example, the air-conditioning controller 22 allows for performing heating while dehumidifying. However, if the outside air temperature (TG) is higher than 25° C., for example, then the operation modes of the heat pump device 20 are switched into the cooling operation mode.

If the heating operation mode has been selected in the main routine, the operation modes of the heat pump device 20 are changed into the heating operation mode. In the heating operation mode, the number of revolutions of the first and second cooling fans 37*a*, 38*a* may be set to be the middle, for example, as in the timing diagram shown in FIG. 6. However, the number of revolutions of the first and second cooling fans 37*a* and 38*a* may be changed according to the air-conditioning load.

Also, since this is the heating operation mode, the second expansion valve 53 arranged upstream of the exterior heat exchanger 33 in the refrigerant flow direction is half-closed to cause adiabatic expansion of the refrigerant. In this case, the refrigerant in the refrigerant inlet pipe 33*h* of the exterior heat exchanger 33 may have a temperature of −5° C., for example.

Also, the number of revolutions of the motor-driven compressor 30 varies according to the air-conditioning load but is the range of low to middle speeds. Furthermore, the PTC heater 67 is supposed to be OFF, but may be turned ON as the case may be according to the air-conditioning load.

During the heating mode of operation, the exterior heat exchanger 33 frosts gradually. Although that frosting proceeds differently according to the configuration and operation state of the heat pump device 20, frosting proceeds in this embodiment from the refrigerant outlet toward the refrigerant inlet.

Then, during the heating mode of operation, the temperature of the refrigerant in the refrigerant inlet pipe 33*h* of the exterior heat exchanger 33 decreases gradually as shown in the timing diagram. When the temperature of the refrigerant in the refrigerant inlet pipe 33*h* reaches −8° C. that is the frosting determination temperature, the air-conditioning controller 22 decides that the exterior heat exchanger 33 is frosted, and changes the operation modes of the heat pump device 20 from the heating operation mode into the defrosting operation mode. That is to say, the second expansion valve 53 is fully opened. As a result, a non-expanded high-temperature refrigerant flows into the exterior heat exchanger 33 to start defrosting. Note that the frosting determination temperature does not have to be −8° C.

On the other hand, in the defrosting operation mode, the air-conditioning controller 22 stops the first and second cooling fans 37*a*, 38*a* to reduce the dissipation of heat by the exterior heat exchanger 33. Also, in the defrosting operation mode, the air-conditioning controller 22 sets the number of revolutions of the motor-driven compressor 30 to be higher than in the heating operation mode such that the compressor 30 runs at the maximum number of revolutions. Furthermore, the air-conditioning controller 22 turns the PTC heater 67 ON and sets the degree of heating to be medium, for example, thereby preventing the temperature of the air being blown out into the vehicle cabin from decreasing significantly. In this case, the flow rate of the air being blown by the blower 65 may be set to be lower than in the heating operation mode.

Once the operation modes have been switched into the defrosting operation mode, the temperature of the refrigerant in the refrigerant inlet pipe 33*h* of the exterior heat exchanger 33 rises gradually. When the temperature of the refrigerant in the refrigerant inlet pipe 33*h* exceeds 20° C. (first predetermined temperature), for example, it is estimated that the frost on the first and second paths P1 and P2 closer to the refrigerant inlet of the exterior heat exchanger 33 has melted to produce water outside the first and second paths P1 and P2. Thus, the first cooling fan 37*a* is activated for only a predetermined period of time. The number of revolutions of the first cooling fan 37*a* is set to be the maximum one. Also, the first cooling fan 37*a* may be activated for several seconds, for example. By making the first cooling fan 37*a* blow air against it, the water present outside the first and second paths P1 and P2 closer to the refrigerant inlet of the exterior heat exchanger 33 is blown off and drained. As a result, the quantity of heat removed from the refrigerant by the water present outside the first and second paths P1 and P2 may be reduced, thus allowing for supplying a high-temperature refrigerant to the third and fourth paths P3 and P4 downstream in the refrigerant flow direction.

After that, the temperature of the refrigerant in the refrigerant inlet pipe 33*h* of the exterior heat exchanger 33 further rises gradually. When the temperature of the refrigerant in the refrigerant inlet pipe 33*h* exceeds 28° C. (second predetermined temperature), for example, it is estimated that the frost on the third and fourth paths P3 and P4 closer to the refrigerant outlet of the exterior heat exchanger 33 has melted to produce water outside the third and fourth paths P3 and P4. In this case, the quantity of the water present outside the third and fourth paths P3 and P4 should be larger than that of the water present outside the first and second paths P1 and P2, because the third and fourth paths P3 and P4 will be frosted more easily than the first and second paths P1 and P2, as described above.

When the temperature of the refrigerant in the refrigerant inlet pipe 33*h* exceeds 28° C., for example, the second cooling fan 38*a* is rotated for only a predetermined period of time. The number of revolutions of the second cooling fan 38*a* is set to be the maximum one. Also, the second cooling fan 38*a* may be activated for several seconds, for example. By activating the second cooling fan 38*a* at the maximum number of revolutions, a greater quantity of air is blown against the exterior heat exchanger 33 compared to a situation where the first cooling fan 37*a* is rotated at the maximum number of revolutions. This thus allows for blowing off, and draining, reliably the water present outside the third and fourth paths P3 and P4, even if there is much water there. Consequently, the quantity of heat removed from the high-temperature refrigerant by the outside water may be reduced, thus allowing for finishing defrosting in a shorter time.

In this embodiment, when the temperature of the refrigerant in the refrigerant inlet pipe 33*h* of the exterior heat exchanger 33 reaches 32° C., for example, the defrosting mode of operation is supposed to be finished to resume the heating mode of operation again. Before the temperature of the refrigerant in the refrigerant inlet pipe 33*h* of the exterior heat exchanger 33 reaches 32° C. (i.e., before the defrosting mode of operation is finished) and when it is estimated that almost all of the frost has already melted (e.g., when the temperature of the refrigerant in the refrigerant inlet pipe 33*h* reaches 31° C., for example), the first and second cooling fans 37*a* and 38*a* are activated at the maximum number of revolutions. In this manner, the water present outside the exterior heat exchanger 33 may be blown off entirely.

Thereafter, when the temperature of the refrigerant in the refrigerant inlet pipe 33*h* of the exterior heat exchanger 33 reaches 32° C., for example, the heating mode of operation is resumed again. In the heating operation mode, the number of revolutions of the first and second cooling fans 37*a* and 38*a* is set to be middle, and the second expansion valve 53 is half-closed. As a result, the temperature of the refrigerant in the refrigerant inlet pipe 33*h* of the exterior heat exchanger 33 decreases gradually. Also, right after the heating mode of operation has been resumed, the motor-driven compressor 30 is run at the maximum number of revolutions, and heating by the PTC heater 67 is continued, for a predetermined period of time. This thus prevents the temperature of the air being blown out into the vehicle cabin from decreasing significantly.

As can be seen from the foregoing description, in the vehicle air conditioner 1 according to this first embodiment, if the third and fourth paths P3 and P4 closer to the refrigerant outlet of the exterior heat exchanger 33 frost more easily than the first and second paths P1 and P2 closer to the refrigerant inlet thereof due to absorption of heat into the exterior heat exchanger 33 in the heating operation mode, the flow rate of the air being blown by the second cooling fan 38*a* to pass through the third and fourth paths P3 and P4 is set to be higher than that of the air being blown by the first cooling fan 37*a*. This thus allows for blowing off reliably the water present outside the third and fourth paths P3 and P4. This reduces the quantity of heat removed by that outside water from the high-temperature refrigerant flowing through the heat-transfer pipes 33*a* and shortens the time for defrosting, thus allowing for increasing the occupant's comfortableness.

In addition, the first and second cooling fans 37*a* and 38*a* are activated independently of each other according to the degree of defrosting of the exterior heat exchanger 33 during the defrosting mode of operation. This allows for draining efficiently the water present outside the exterior heat exchanger 33, thus improving the heating performance when frosting and defrosting occur recurrently during its operation.

If the temperature of the refrigerant in a region closer to the refrigerant inlet of the exterior heat exchanger 33 has risen to exceed a first predetermined temperature (of 20° C., for example), then the frost on the first and second paths P1 and P2 closer to the refrigerant inlet is estimated to have melted. In that case, by keeping the first cooling fan 37*a* activated for a predetermined period of time, the water present outside the first and second paths P1 and P2 may be blown off. This thus allows for defrosting the third and fourth paths P3 and P4 quickly by supplying a high-temperature refrigerant to the third and fourth paths P3 and P4 quickly.

Meanwhile, if the temperature of the refrigerant in a region closer to the refrigerant inlet of the exterior heat exchanger 33 has risen to exceed a second predetermined temperature (of 28° C., for example), then the frost on the third and fourth paths P3 and P4 is estimated to have melted, too. In that case, by keeping the second cooling fan 38*a* activated for a predetermined period of time, the water present outside the third and fourth paths P3 and P4 may be blown off.

In addition, since the exterior refrigerant temperature sensor 83 for detecting the refrigerant temperature state in a region closer to the refrigerant inlet of the exterior heat exchanger 33 is used as a frosting state detecting means, the first and second cooling fans 37*a* and 38*a* are controllable with an inexpensive configuration.

Furthermore, if this air conditioner is configured such that the refrigerant temperature state in a region closer to the refrigerant outlet of the exterior heat exchanger 33 is detected by the outlet-side temperature sensor 68, the frosting states of the first to fourth paths P1-P4 of the exterior heat exchanger 33 are estimable accurately.

Moreover, as described above, there is a correlation between the frosting state of each path P1-P4 of the exterior heat exchanger 33 and the amount of time that has passed since the defrosting mode of operation was started. The defrosting proceeds mainly on the first and second paths P1 and P2 at the beginning of the defrosting mode of operation, but proceeds mainly on the third and fourth paths P3 and P4 when a certain amount of time passes since the start of the defrosting mode of operation. Optionally, as shown in FIG. 2, a timer 22*b* may be provided as a clocking means for recording the amount of time that has passed since the defrosting mode of operation was started for the air-conditioning controller 22. According to the present disclosure, the timer 22*b* is used as a frosting state detecting means. The air-conditioning controller 22 is configured to activate the first cooling fan 37*a* when the timer 22*b* senses the amount of time that has passed since the defrosting mode of operation was started exceed a first predetermined amount of time (i.e., the time it takes to allow defrosting to proceed on the first and second paths P1 and P2) and then stop the first cooling fan 37*a*, and to activate the second cooling fan 38*a* when the timer 22*b* senses the amount of time that has passed since the defrosting mode of operation was started exceed a second predetermined amount of time (i.e., the time it takes to allow defrosting to proceed on the third and fourth paths P3 and P4) that is longer than the first predetermined amount of time. By using such a timer 22*b*, the frosting state may be detected based on the correlation without detecting the refrigerant temperature or any other parameter, and the first and second cooling fans 37*a* and 38*a* are controllable at a reduced cost adaptively to the frosting state.

In addition, the first and second cooling fans 37*a* and 38*a* are activated before the operation modes of the heat pump device 20 are switched from the defrosting operation mode into the heating operation mode and after the frost on the exterior heat exchanger 33 has melted. Thus, the water present outside the exterior heat exchanger 33 may be blown off in a late stage of the defrosting mode of operation. This improves the heating performance while frosting and defrosting occur recurrently during the operation.

The heat pump device 20 is controlled such that when the heat pump device 20 operates in the defrosting operation mode, the first and second cooling fans 37*a* and 38*a* have a maximum airflow rate. This thus allows for blowing off reliably the water present outside the exterior heat exchanger 33.

Second Embodiment

Figure 7:
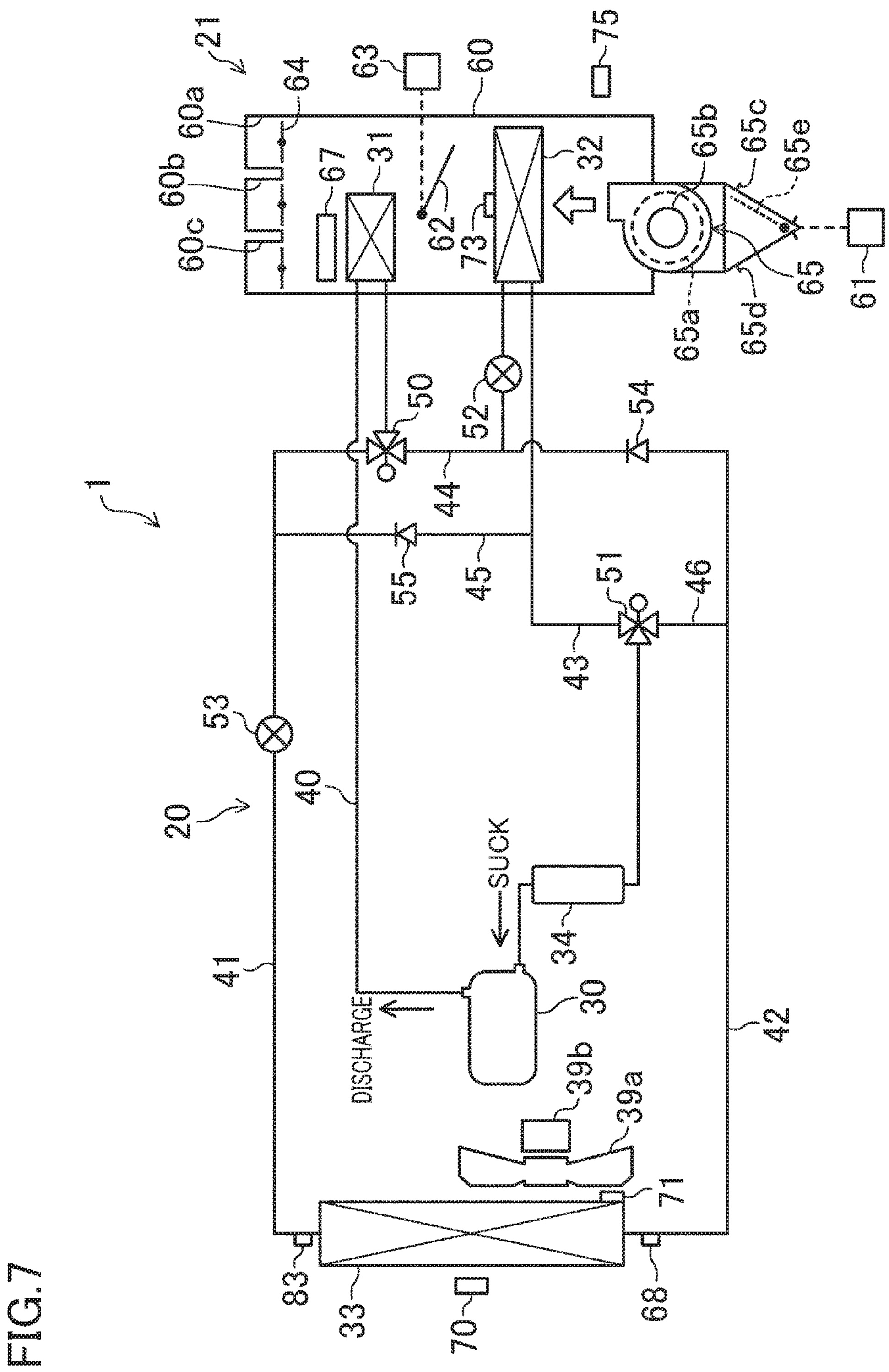
FIG. 7 is a diagram illustrating a second embodiment and corresponding to FIG. 1.
Figure 8:
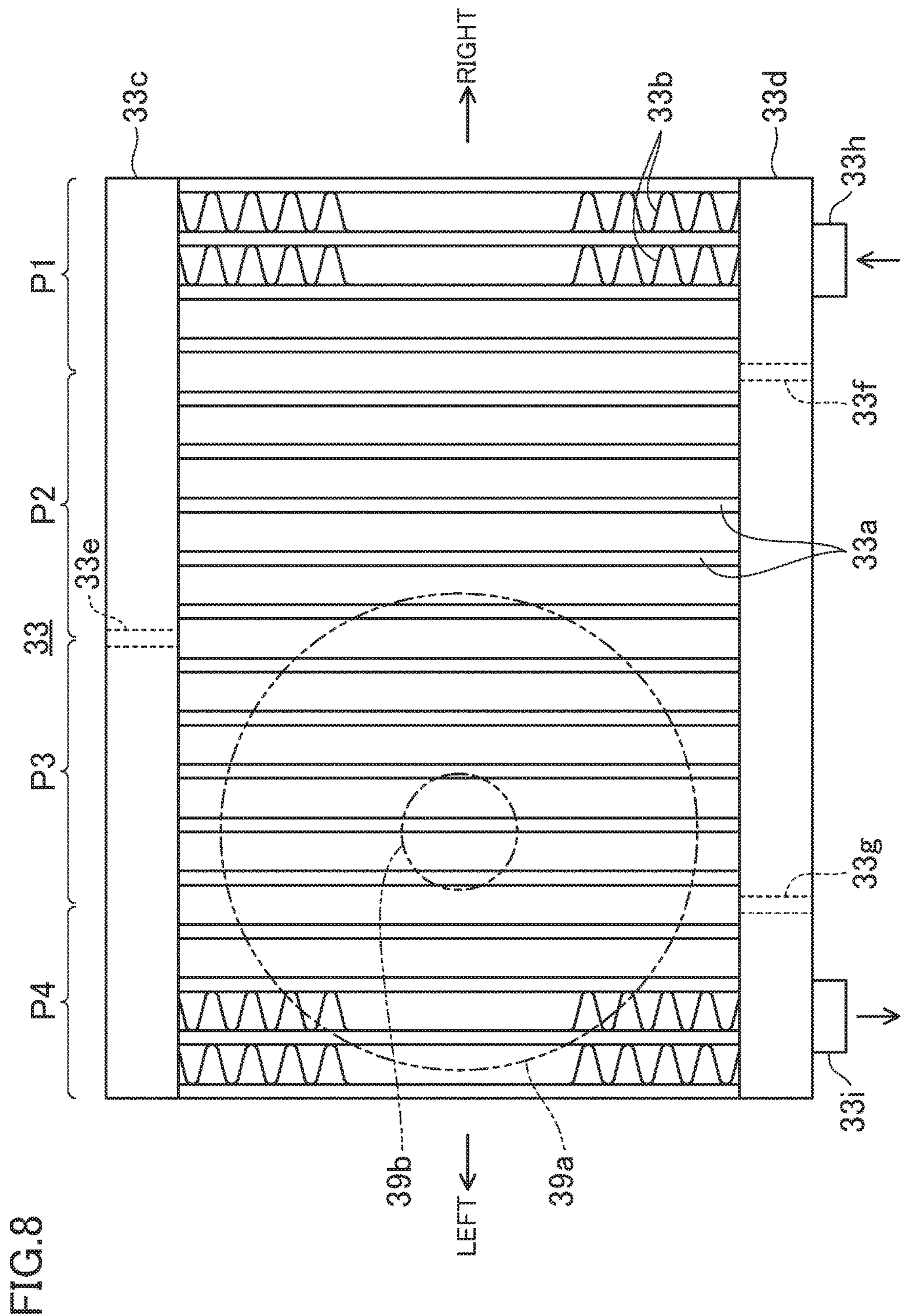
FIG. 8 is a view illustrating the second embodiment and corresponding to FIG. 3.

FIG. 7 illustrates a general configuration for a vehicle air conditioner 1 according to a second embodiment of the present disclosure. In this second embodiment, only one cooling fan 39*a* is provided as an exterior blower and thus the contents of the control are changed, since there is only one cooling fan 39*a*, which is a difference from the first embodiment. However, since the second embodiment is the same as the first embodiment in the other respects, each of the other components of the second embodiment having the same function as their counterpart of the first embodiment described above is identified by the same reference numeral as their counterpart's and will not be described all over again, and the following description will be focused on that difference from the first embodiment.

The cooling fan 39*a* is provided such that the center of the cooling fan 39*a* is offset toward the refrigerant outlet with respect to the middle of the exterior heat exchanger 33 in the lateral direction of the vehicle. Thus, the flow rate of the air being blown by the cooling fan 39*a* to pass through the third and fourth paths P3 and P4 in a region closer to the refrigerant outlet of the exterior heat exchanger 33 is set to be higher than that of the air to pass through the first and second paths P1 and P2 in another region closer to the refrigerant inlet of the exterior heat exchanger 33.

The heating mode of operation is carried out in the same way as the first embodiment except that the only one cooling fan 39*a* is used. During the heating mode of operation, frost formation on the exterior heat exchanger 33 proceeds from the refrigerant outlet toward the refrigerant inlet thereof.

As shown in the timing diagram of FIG. 9, when the temperature of the refrigerant in the refrigerant inlet pipe 33*h* reaches a frosting determination temperature of −8° C. during the heating mode of operation, the air-conditioning controller 22 switches the operation modes of the heat pump device 20 from the heating operation mode into the defrosting operation mode.

Also, during the defrosting mode of operation, the air-conditioning controller 22 stops the cooling fan 39*a* to reduce the dissipation of heat by the exterior heat exchanger 33.

Once the operation modes have been switched into the defrosting operation mode, the temperature of the refrigerant in the refrigerant inlet pipe 33*h* of the exterior heat exchanger 33 rises gradually. When the temperature of the refrigerant in the refrigerant inlet pipe 33*h* exceeds 28° C., for example, it is estimated that the frost on the first and second paths P1 and P2 closer to the refrigerant inlet of the exterior heat exchanger 33 and the frost on the third and fourth paths P3 and P4 closer to the refrigerant outlet have melted to produce water outside these paths. In this case, there is more water present outside the third and fourth paths P3 and P4 than outside the first and second paths P1 and P2.

When the temperature of the refrigerant in the refrigerant inlet pipe 33*h* exceeds 28° C., the cooling fan 39*a* is activated for only a predetermined period of time. The number of revolutions of the cooling fan 39*a* is set to be the maximum one. Also, the cooling fan 39*a* may be activated for several seconds, for example. By activating the cooling fan 39*a* at the maximum number of revolutions, the flow rate of the air being blown toward a region closer to the refrigerant outlet of the exterior heat exchanger 33 increases. Thus, even if there is a lot of water present outside the third and fourth paths P3 and P4, the water may be blown off and drained reliably. This reduces the quantity of heat removed by that outside water from the high-temperature refrigerant and shortens the time for defrosting.

Also, before the defrosting mode of operation ends and when it is estimated that the frost has melted almost entirely (i.e., when the temperature of the refrigerant in the refrigerant inlet pipe 33*h* reaches 31° C., for example), the cooling fan 39*a* is activated at the maximum number of revolutions. This thus allows for blowing off the water present outside the exterior heat exchanger 33.

Thereafter, when the temperature of the refrigerant in the refrigerant inlet pipe 33*h* of the exterior heat exchanger 33 reaches 32° C., for example, the heating mode of operation is resumed. In the heating mode of operation, the number of revolutions of the cooling fan 39*a* is set to be middle.

As can be seen from the foregoing description, in the vehicle air conditioner 1 according to this second embodiment, if the third and fourth paths P3 and P4 closer to the refrigerant outlet of the exterior heat exchanger 33 frost more easily than the first and second paths P1 and P2 closer to the refrigerant inlet thereof due to absorption of heat into the exterior heat exchanger 33 in the heating operation mode, the water present outside the third and fourth paths P3 and P4 may be blown off, because the cooling fan 39*a* is provided to be offset toward the third and fourth paths P3 and P4. This reduces the quantity of heat removed by that outside water from the high-temperature refrigerant flowing through the heat-transfer pipes 33*a* and shortens the time for defrosting, thus allowing for increasing the occupant's comfortableness.

The number of paths provided for the exterior heat exchanger 33 does not have to be four, but may also be two, three, or five or more.

In the first and second embodiments described above, the flow velocity distribution of the exterior heat exchanger 33 is set in accordance with the locations of the cooling fans 37*a*, 38*a* and 39*a* such that the flow rate of the air being blown through the paths P3 and P4 closer to the refrigerant outlet of the exterior heat exchanger 33 becomes higher than that of the air being blown through the paths P1 and P2 closer to the refrigerant inlet of the exterior heat exchanger 33. However, this is only a non-limiting exemplary embodiment. Alternatively, the shapes of shrouds and ducts (not shown) may be modified such that the flow rate of the air being blown through the paths P3 and P4 closer to the refrigerant outlet of the exterior heat exchanger 33 becomes higher than that of the air being blown through the paths P1 and P2 closer to the refrigerant inlet of the exterior heat exchanger 33.

Note that each and every embodiment described above is just an example in any respect and should not be construed to be a limiting one. Besides, any variations or modifications falling within the range of equivalents to the claims to be described below are all encompassed within the scope of the present disclosure.

As can be seen from the foregoing description, a vehicle air conditioner 1 according to the present disclosure may be mounted on an electric vehicle and various other kinds of vehicles, for example.

What is claimed is:

1. A vehicle air conditioner comprising:

a heat pump device including a compressor which compresses a refrigerant, an interior heat exchanger provided inside a vehicle cabin, an exterior heat exchanger provided outside the vehicle cabin, an expansion valve, and an exterior blower which blows air toward the exterior heat exchanger, the heat pump device being formed by connecting together the compressor, the interior heat exchanger, the expansion valve, and the exterior heat exchanger via refrigerant piping;

an air-conditioning controller configured to control the heat pump device; and a frosting state detecting means for detecting a frosting state of the exterior heat exchanger, the heat pump device being configured to be switched by the air-conditioning controller between multiple operation modes including a heating operation mode and a defrosting operation mode, wherein the exterior heat exchanger includes a plurality of heat-transfer pipes which run vertically and are arranged side-by-side horizontally when installed and the vehicle is on level ground and a header tank which is connected to an end of the heat-transfer pipes and which extends horizontally, the header tank has a refrigerant inlet portion and a refrigerant outlet portion which are provided along the length of the header tank so as to be spaced apart from each other, and a partition which partitions the heat-transfer pipes into a plurality of paths such that a refrigerant flow that goes from the refrigerant inlet portion toward the refrigerant outlet portion is formed, the exterior blower includes a first fan and a second fan which are arranged horizontally along an air passage plane of the exterior heat exchanger so as to be located closer to the refrigerant inlet and the refrigerant outlet, respectively, the airflow rate of the second fan is set to be higher than the airflow rate of the first fan such that the flow rate of the air being blown by the second fan to pass through one of the paths closer to a refrigerant outlet of the exterior heat exchanger is higher than the flow rate of the air being blown by the first fan to pass through another one of the paths closer to a refrigerant inlet of the exterior heat exchanger than the one of the paths, and the air-conditioning controller is configured to switch, if the frosting state detecting means senses, during the heating mode of operation, that the exterior heat exchanger is frosted, the operation modes of the heat pump device into a defrosting operation mode in which the air-conditioning controller initially stops the first and second fans and then activates the first and second fans independently of each other according to the degree of defrosting of the exterior heat exchanger during the defrosting mode of operation.

2. The vehicle air conditioner of claim 1, wherein the frosting state detecting means includes an outlet-side refrigerant temperature detecting means for detecting a refrigerant temperature state in a region closer to the refrigerant outlet of the exterior heat exchanger than to the refrigerant inlet, and the air-conditioning controller is configured to activate the first fan when the refrigerant temperature detected by the outlet-side refrigerant temperature detecting means exceeds a first predetermined temperature and then stop the first fan, and to activate the second fan when the refrigerant temperature detected by the outlet-side refrigerant temperature detecting means exceeds a second predetermined temperature that is higher than the first predetermined temperature.

3. The vehicle air conditioner of claim 1, wherein the air-conditioning controller controls the heat pump device such that when the heat pump device operates in the defrosting operation mode, the exterior blower has a maximum airflow rate.

4. The vehicle air conditioner of claim 1, wherein the heat pump device includes a first interior heat exchanger and a second interior heat exchanger which is arranged upstream of the first interior heat exchanger in an airflow direction, and the heat pump device makes the first and second interior heat exchangers function as radiators during the heating mode of operation.

5. The vehicle air conditioner of claim 1, wherein the frosting state detecting means includes an inlet-side refrigerant temperature detecting means for detecting a refrigerant temperature state in a region closer to the refrigerant inlet of the exterior heat exchanger than to the refrigerant outlet portion, and the air-conditioning controller is configured to activate the first fan when the refrigerant temperature detected by the inlet-side refrigerant temperature detecting means exceeds a first predetermined temperature and then stop the first fan, and to activate the second fan when the refrigerant temperature detected by the inlet-side refrigerant temperature detecting means exceeds a second predetermined temperature that is higher than the first predetermined temperature.

6. The vehicle air conditioner of claim 1, wherein the frosting state detecting means includes a clocking means for recording the amount of time that has passed since the defrosting mode of operation was started, and the air-conditioning controller is configured to activate the first fan when the clocking means senses the amount of time that has passed since the defrosting mode of operation was started exceeds a first predetermined amount of time and then stop the first fan, and to activate the second fan when the clocking means senses the amount of time that has passed since the defrosting mode of operation was started exceed a second predetermined amount of time that is longer than the first predetermined amount of time.

7. The vehicle air conditioner of claim 1, wherein the air-conditioning controller is configured to activate the exterior blower before the operation modes of the heat pump device are switched from the defrosting operation mode into the heating operation mode and after it has been estimated that the frost on the exterior heat exchanger has melted.

* * * * *